(12) United States Patent
Oguz et al.

(10) Patent No.: US 7,054,367 B2
(45) Date of Patent: May 30, 2006

(54) EDGE DETECTION BASED ON VARIABLE-LENGTH CODES OF BLOCK CODED VIDEO

(75) Inventors: Seyfullah H. Oguz, Shrewsbury, MA (US); Ugur Sezer, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 710 days.

(21) Appl. No.: 10/038,949

(22) Filed: Dec. 31, 2001

(65) Prior Publication Data

US 2003/0142750 A1    Jul. 31, 2003

(51) Int. Cl.
    *H04N 7/12*    (2006.01)
(52) U.S. Cl. ................................. 375/240.23
(58) Field of Classification Search ........... 375/240.01, 375/240.08, 240.18, 240.19, 240.2, 240.23, 375/240.24, 240.25, 240.26, 240.29; 382/260; H04N 7/12
    See application file for complete search history.

(56) References Cited

U.S. PATENT DOCUMENTS

| | | | | |
|---|---|---|---|---|
| 5,488,418 A | * | 1/1996 | Mishima et al. | ....... 375/240.23 |
| 5,565,998 A | | 10/1996 | Coombs et al. | |
| 6,801,672 B1 | * | 10/2004 | Thomas | ....................... 382/260 |

OTHER PUBLICATIONS

"Information technology—Generic coding of moving pictures and associated audio information: Systems," International Standard, ISO/IEC 13818-1:1996(E), 136 pages.

"Information technology—Generic coding of moving pictures and associated audio information: Video," International Standard, ISO/IEC 13818-2:1996(E), 211 pages.

"Information technology—Generic coding of moving pictures and associated audio information—Part 3: Audio," International Standard, ISO/IEC 13818-3:1995(E), 118 pages.

"A Guide to MPEG Fundamentals and Protocol Analysis (Including DVB and ATSC)," Tektronix, Inc., Beaverton, Oregon, 1997, 48 pages.

Boon-Lock Yeo, "On fast microscopic browsing of MPEG-compressed video," IBM T.J. Watson Research Center, Jan. 1998, Multimedia Systems 7, 1999, pp. 269-281.

Nilesh V. Patel and Ishwar K. Sethi, *Compressed Video Processing For Cut Detection*, Vision and Neural Networks Laboratory, Dept. of Computer Science, Wayne State University, Detroit, MI, Oct. 1997, 26 pages.

(Continued)

*Primary Examiner*—Young Lee
(74) *Attorney, Agent, or Firm*—Richard C Auchterlouie; Novak Druce & Quigg, LLP

(57) ABSTRACT

Edges are detected in block coded video by a threshold comparison upon the lengths of variable-length codes used for encoding the differential DC coefficients of the pixel blocks. A thinning filter compares the code lengths of the differential DC coefficients of adjacent blocks in order to retain the edge indications of more significant edges and to exclude the edge indications of less significant edges. The edge indications can be split into substantially independent channels for luminance or chrominance, for edges having positive or negative horizontal gradient components, and for edges having positive or negative vertical gradient components. The edge indications for successive frames in an MPEG sequence are compared to each other in various ways in order to detect scene changes.

22 Claims, 21 Drawing Sheets

OTHER PUBLICATIONS

Nilesh V. Patel and Ishwar K. Sethi, *Video Shot Detection and Characterization for Video Databases,* Vision and Neural Networks Laboratory, Dept. of Computer Science, Wayne State University, Detroit, MI, Oct. 1997, 22 pages.

Bo Shen, Ishwar K. Sethi and Vasudev Bhaskaran, *DCT Convolution and Its Application In Compressed Video Editing,* Dept. of Computer Science, Wayne State University, Detroit, MI and Visual Computing Dept., Hewlett-Packard Laboratories, Palo Alto, CA, *To appear in SPIE VCDIP '97, also submitted to IEEE Trans. Cir. And Sys. For Video Tech.,* 11 pages.

B. Shen and I.K. Sethi, *Convolution-Based Edge Detection for Image/Video in Block DCT Domain,* Vision & Neural Networks Laboratory, Dept. of Computer Science, Wayne State University, Detroit, MI, *To appear in Journal of Visual Communications and Image Representation,* 19 pages.

Bo Shen and Ishwar K. Sethi, *Direct feature extraction from compressed images,* Vision and Neural Networks Laboratory, Dept. of Computer Science, Wayne State University, Detroit, MI, *SPIE* vol. 2670, *Storage & Retrieval for Image and Video Databases IV,* 1996, 12 pages.

Bo Shen and Ishwar K. Sethi, *Block-Based Manipulations On Transform-Compressed Images and Videos,* Vision and Neural Networks Laboratory, Dept. of Computer Science, Wayne State University, Detroit, MI, *To appear in Multimedia Systems,* 26 pages.

Bo Shen and Ishwar K. Sethi, *Inner-Block Operations On Compressed Images,* Vision and Neural Networks Laboratory, Dept. of Computer Science, Wayne State University, Detroit, MI, *ACM Multimedia '95,* San Francisco, CA, Nov. 5-9, 1995, 10 pages.

Tony Lindeberg, *Scale-space: A framework for handling image structures at multiple scales,* Computational Vision and Active Perception Laboratory, Department of Numerical Analysis and Computing Science KTH, (Royal Institute of Technology), Stockholm, Sweden, http://www.nada.kth.se/~tony/cern-review/cern-html/cern-html.html;http://www.nada.kth.se/~tony/cern-review/cern-html/cern-html/node1.html_to_node.22.html, dated as early as Sep. 27, 2001, 30 pages.

Image Processing: Edge Detection, Rice University, Houston, Texas, http://www.owlnet.rice.edu/~elec539/Projects97/morphjrks/moredge.html; http://www.owlnet.rice.edu/~elec539/Projects97/morphjrks/laplacian.html; http://www.owlnet.rice.edu/~elec539/Projects97/morphjrks/automorph.html; http://www.owlnet.rice.edu/~elec539/Projects97/morphjrks/themainpage.html; http://www.owlnet.rice.edu/~elec539/Projects97/morphjrks/morph.html; http://www.owlnet.rice.edu/~elec539/Projects97/morphjrks/perf_point.html; http://www.owlnet.rice.edu/~elec539/Projects97/morphjrks/warp.html; http://www.owlnet.rice.edu/~elec539/Projects97/morphjrks/warpsri.html; http://www.owlnet.rice.edu/~elec539/Projects97/morphjrks/trans.html;http://www.owlnet.rice.edu/~elec539/Projects97/morphjrks/perf.html; dated as early as Sep. 27, 2001, 22 pages.

Mike Heath, Sudeep Sarkar, Thomas Sanocki, and Kevin Bowyer, *Comparison of Edge Detectors: A Methodology and Initial Study,* Computer Science & Engineering, Dept. of Psychology, University of South Florida, Tampa, Florida, 35 pages.

Michael D. Heath, *A Robust Visual Method For Assessing The Relative Performance of Edge Detection Algorithms,* Master's Thesis, Dec. 1996, University of South Florida, 145 pages.

* cited by examiner

EDGE DETECTION BASED ON VARIABLE-LENGTH CODES OF BLOCK CODED VIDEO

BACKGROUND OF THE INVENTION

1. Field of the Invention

The present invention relates to processing of compressed visual data, and in particular the processing and storage of compressed visual data for playing, transmission, or editing of an MPEG data stream.

2. Background Art

It has become common practice to compress audio/visual data in order to reduce the capacity and bandwidth requirements for storage and transmission. Some of the most popular audio/video compression techniques are defined by the MPEG family of standards. MPEG is an acronym for the Moving Picture Experts Group, which was set up by the International Standards Organization (ISO) to work on the compression of audio/visual information. MPEG provides a number of different variations (MPEG-1, MPEG-2, etc.) to suit different bandwidth and quality constraints. MPEG-2, for example, is especially suited to the storage and transmission of broadcast quality television programs.

For the video data, MPEG provides a high degree of compression (up to 200:1) by transforming 8×8 blocks of pixels into a set of discrete cosine transform (DCT) coefficients, quantizing and encoding the coefficients, and using motion compensation techniques to encode most video frames as predictions from or between other frames. In particular, the encoded MPEG video stream is comprised of a series of groups of pictures (GOPs), and each GOP begins with an independently encoded (intra) I-frame and may include one or more following P-frames and B-frames. Each I-frame can be decoded without information from any preceding and/or following frame. Decoding of a P-frame in general requires information from a preceding (I or P) frame in the same GOP. Decoding of a B-frame in general requires information both from a preceding (I or P) frame in the previous or the same GOP and a following (I or P) frame in the same GOP.

The MPEG-2 standard is documented in ISO/IEC International Standard (IS) 13818-1, "Information Technology-Generic Coding of Moving Pictures and Associated Audio Information: Systems," ISO/IEC IS 13818-2, "Information Technology-Generic Coding of Moving Pictures and Associated Audio Information: Video," and ISO/IEC IS 13818-3, "Information Technology-Generic Coding of Moving Pictures and Associated Audio Information: Audio," which are incorporated herein by reference. A concise introduction to MPEG is given in "A Guide to MPEG Fundamentals and Protocol Analysis (Including DVB and ATSC)," Tektronix Inc., 1997, incorporated herein by reference.

One application of MPEG-2 coded video is video-on-demand (VOD). In a VOD application, the video is stored in a server as MPEG-2 coded video. The server streams MPEG-2 coded video in real time to a subscriber's decoder. The subscriber may operate a remote control providing well-known classical videocassette recorder (VCR) functions including play, stop, fast-forward, fast-reverse, pause, slow-forward and slow-reverse.

Another application of MPEG-2 coded video is an MPEG-2 VCR. In an MPEG-2 VCR application, the video is stored on a digital cassette in MPEG-2 coded video format. The MPEG-2 VCR streams MPEG-2 coded video in real time to an MPEG-2 decoder. The operator may operate a control providing well-known classical VCR functions including play, stop, fast-forward, fast-reverse, pause, slow-forward and slow-reverse.

A third application of MPEG-2 coded video is an MPEG-2 based video editing station. In an MPEG-2 based video editing station, all video materials are stored in MPEG-2 coded video format on tapes or disks. The operators may compile and edit the MPEG-2 coded video in order to create a final broadcast version.

In the above applications of MPEG-2 coded video, it would be desirable to provide an automatic method of detecting scene changes or identifying certain objects in the (visual) scenes. For example, in lieu of a conventional fast-forward function, the viewer could be provided with a function to skip forward to a next scene or skip back to a previous scene, or a function to successively display new scenes in a forward or reverse direction. Such scene display functions would omit the display of repetitious and therefore irrelevant video frames in order for the viewer to find more quickly a new scene from which regular speed forward-play may commence. The detection of a scene change, however, involves a comparison of video information between successive frames, and conventional methods for performing such a comparison are computationally intensive. For real-time detection of scene changes, there is a need for fast, computationally efficient, and reasonably successful detection of scene changes.

SUMMARY OF THE INVENTION

In accordance with a basic aspect of the invention, there is provided a method of detecting edges in a compressed video sequence. The compressed video sequence includes at least one frame of block encoded video data. The frame of block encoded video data includes variable-length codes for transform coefficients of blocks of pixels in the compressed video sequence. The transform coefficients include a respective DC coefficient for each of the blocks of pixels. Each respective DC coefficient for at least some of the blocks of pixels is encoded as a respective variable-length code having a length indicating a certain range of differences in DC coefficient values between adjacent ones of the blocks of pixels. The method includes decoding only the length of the respective variable-length code for the respective DC coefficient for each of at least some of the blocks of pixels in order to produce an indication of whether or not the compressed video sequence includes an edge associated with each of the at least some of the blocks of pixels, and performing a code length threshold comparison upon the length of the respective variable-length code for the respective DC coefficient for each of the at least some of the blocks of pixels for producing at least one respective bit indicating whether or not the compressed video sequence includes an edge associated with said each of the at least some of the blocks of pixels.

In accordance with another aspect, the invention provides a method of detecting edges in a compressed video sequence. The compressed video sequence includes at least one I-frame of MPEG video data. The I-frame of MPEG video data includes variable-length codes for DCT coefficients of 8×8 pixel blocks in the image. The DCT coefficients include a respective DC coefficient for each of the 8×8 pixel blocks. Each respective DC coefficient for at least some of the 8×8 pixel blocks is encoded as a respective variable-length code having a length indicating a certain range of differences in DC coefficient values between adjacent ones of the 8×8 pixel blocks. The method includes decoding only the length of the respective variable-length code for the respective DC coefficient for each of the at least some of the 8×8 pixel blocks in order to produce an indication of whether or not the compressed video sequence includes an edge associated with each of the at least some of the 8×8 pixel blocks, and performing a code length threshold comparison upon the length of the respective variable-length code for the respective DC coefficient for each of the at least some of the 8×8 pixel blocks for producing at least one respective bit indicating whether or not the compressed video sequence includes an edge associated with each of the at least some of the 8×8 pixel blocks.

In accordance with yet another aspect, the invention provides a method of detecting a scene change between I-frames of MPEG video data. The method includes detecting edges in images represented by the I-frames by decoding lengths of variable-length codes for DCT DC coefficients of 8×8 pixel blocks in the I-frames and performing code length threshold comparisons upon the decoded code lengths to produce respective edge indications for each of the I-frames. The method further includes comparing the edge indications between the I-frames in order to signal a scene change when there is a significant change in the edge indications between the I-frames.

In accordance with a final aspect, the invention provides a method of detecting a scene change between I-frames of MPEG video data. Each of the I-frames includes a series of 8×8 pixel blocks. The method includes detecting edges in images represented by the I-frames to produce a series of respective bits indicating whether or not an edge is associated with at least some of the 8×8 pixel blocks. The method further includes filtering the series of the respective bits indicating whether or not an edge is associated with the at least some of the 8×8 pixel blocks with a thinning filter in order to produce a filtered series of respective bits including more significant edge indications and excluding less significant edge indications. The method further includes operating a digital processor to process the filtered series of respective bits in order to signal a scene change when there is a significant change in features between the I-frames.

BRIEF DESCRIPTION OF THE DRAWINGS

Other objects and advantages of the invention will become apparent upon reading the following detailed description with reference to the accompanying drawings, in which.

Figure 1:
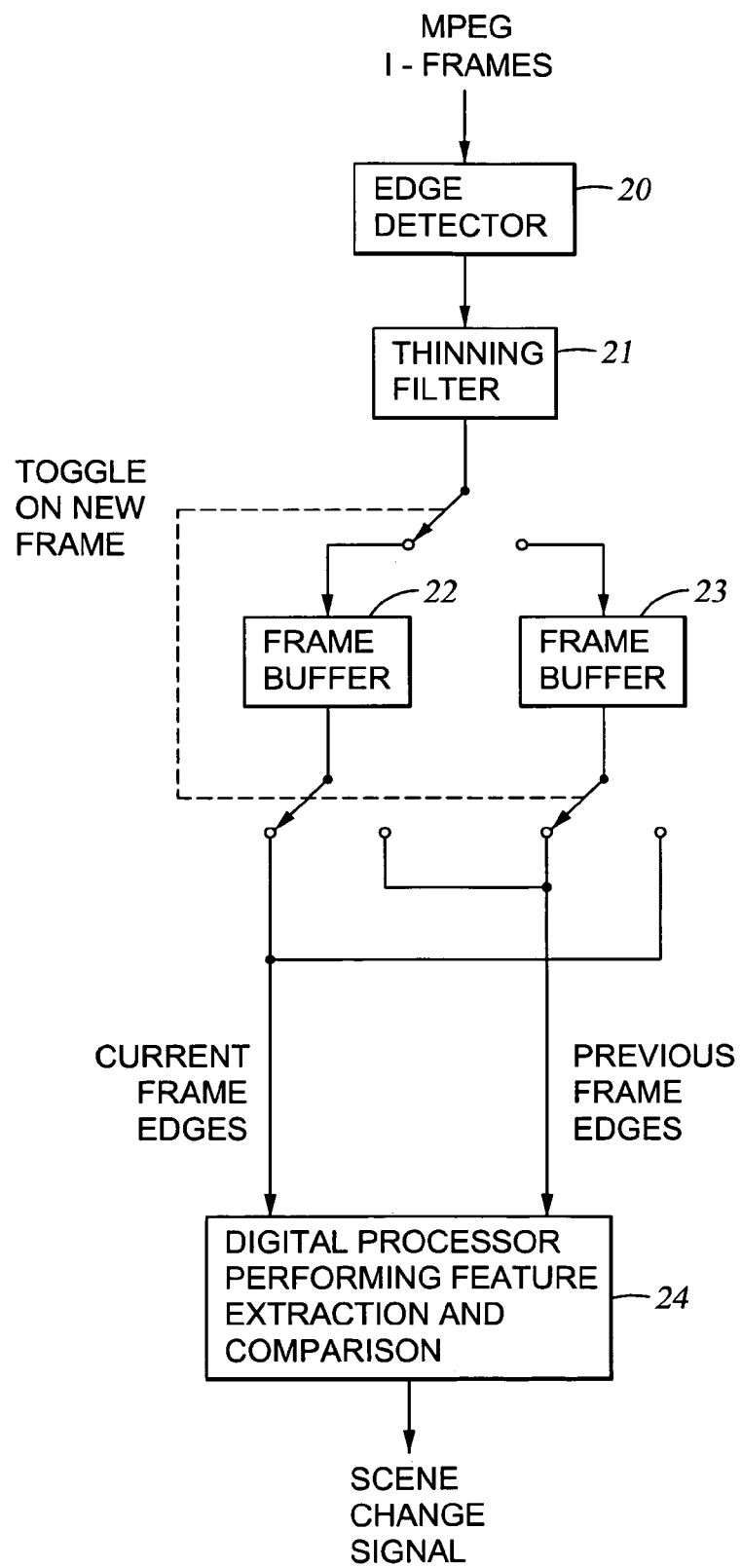
FIG. 1 is a block diagram of a system for processing of an MPEG coded video stream to provide a scene change signal upon reaching a current video I-frame having features that are substantially different from any features in the previous video I-frame.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a block diagram of a system for processing of an MPEG coded video stream to provide a scene change signal upon reaching a current video frame having features that are substantially different from features in the previous video frame. The features are comprised of edges. An edge detector 20 detects the edges occurring between and within blocks in each frame. A thinning filter 21 receives edge indications from the edge detector 20, and eliminates some of the less significant edge indications.

The thinning filter in effect refines the initial edge information and produces information that can be visualized as edge graph information. The amount of the thinning should be carefully selected, and a three-pixel deep thinning is preferred. The remaining edge indications are loaded into a selected one of two ping-pong (parallel) frame buffers 22 and 23.

In order to provide a scene change signal, a digital processor 24 accesses edge indications for a current frame in a selected one of the frame buffers and edge indications for a prior frame in the other one of the frame buffers. The digital processor 24 performs feature extraction and comparison and detects a scene change when there is a significant difference between features in the current frame and features in the previous frame. When a scene change is detected, the current frame is identified as a "key frame" in the MPEG video sequence. If the MPEG video sequence is being read from or written to an MPEG file in data storage, the frames identified as "key frames" could be marked as such in the data storage in a frame or GOP index table or in a metadata file associated with the MPEG file.

There are many known edge detection procedures having varying complexities. However, most are quite complex and computationally expensive. For real-time applications, the computation time is a major factor. In addition not all applications need edge detection results with high fidelity. For the edge detector 20 in the system of FIG. 1, there is a need for a fast and computationally efficient but reasonably successful edge detection procedure.

As will be further described below with reference to FIGS. 3 and 4, the preferred edge detection procedure for the MPEG scene change detection system of FIG. 1 is based on the DC coefficients rather than all 64 coefficients within the DCT block. Therefore, the resolution of the edge detail image drops to $1/8^{th}$ in both horizontal and vertical directions for a resultant reduction to $1/64$ times in the resolution. Moreover, the preferred procedure also does not need to decode the actual value of the DC coefficient. Instead, the edge detection procedure is responsive to the length of the variable-length code used for the predictive encoding of the DC coefficient (dct_dc_differential).

Figure 2:
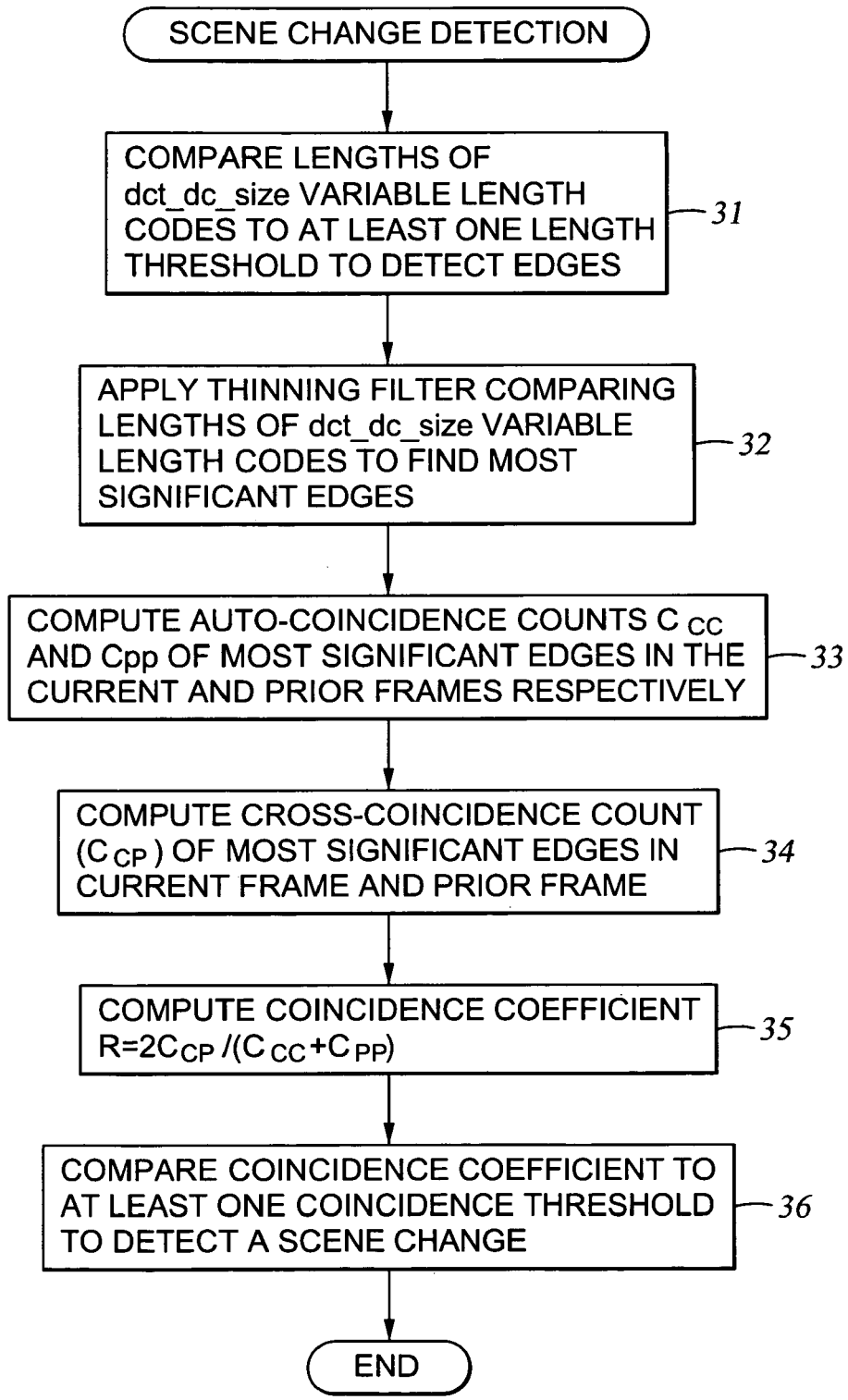
FIG. 2 is a flow chart of a specific procedure that can be used for the processing of FIG. 1 to detect a scene change.

FIG. 2 is a flow chart of a specific procedure that can be used by the system of FIG. 1 to detect a scene change in the MPEG video sequence. In a first step 31, the lengths of the "dct_dc_size" MPEG variable-length codes or alternatively the values of the "dct_dc_size" attributes are compared to at least one length threshold to detect edges in the video frame. The values of the "dct_dc_size" attributes may be employed when the lengths of the "dct_dc_size" variable length codes do not uniquely identify the magnitude class of the differential DC coefficient value. In MPEG-2, for example, the values of the DCT DC coefficients for the first 8×8 luminance (Y) and chrominance (Cb and Cr) pixel blocks at the beginning of each slice of macroblocks in the frame are coded relative to a fixed value, whereas the DCT DC coefficient for each following 8×8 pixel block in the slice is coded relative to the value of the previous DC coefficient in the same slice and in the same color component. In particular, the DCT DC coefficient for each following 8×8 pixel block in the slice is coded as a difference relative to the previous DCT DC coefficient in the same color component. The relative ordering of the 8×8 pixel blocks is defined on the basis of a block scan order described in the MPEG-2 standard. A substantial difference between the DCT DC coefficient values of a pair of neighboring blocks in the same color component, implies that the blocks have different color (luminance and/or chrominance) features, and hence an edge is likely to be there.

The following Tables B-12 and B-13, reproduced from page 125 of the above-cited MPEG-2 standard document ISO/IEC IS 13818-2, show how the respective differences between the DCT DC coefficients of neighboring 8×8 pixel blocks of the same color component, luminance (Y) or chrominance (Cb or Cr), are variable-length coded. The tables are such that as the difference becomes larger in magnitude, more bits are required to code it. Therefore, the longer VLC codes indicate substantial differences, and the VLC code length can be compared to a threshold length to provide an indication of whether or not an edge with a contrast (gradient) stronger than a predefined value is present in the vicinity of the respective 8×8 pixel bock in the image.

TABLE B-12

Variable length codes for dct_dc_size_luminance

| Variable length code | dct_dc_size_luminance |
|---|---|
| 100 | 0 |
| 00 | 1 |
| 01 | 2 |
| 101 | 3 |
| 110 | 4 |
| 1110 | 5 |
| 1111 0 | 6 |
| 1111 10 | 7 |
| 1111 110 | 8 |
| 1111 1110 | 9 |
| 1111 1111 0 | 10 |
| 1111 1111 1 | 11 |

TABLE B-13

Variable length codes for dct_dc_size_chrominance

| Variable length code | dct_dc_size_chrominance |
|---|---|
| 00 | 0 |
| 01 | 1 |
| 10 | 2 |
| 110 | 3 |
| 1110 | 4 |
| 1111 0 | 5 |
| 1111 10 | 6 |
| 1111 110 | 7 |
| 1111 1110 | 8 |
| 1111 1111 0 | 9 |
| 1111 1111 10 | 10 |
| 1111 1111 11 | 11 |

To detect edges, the MPEG-2 video bit stream is only parsed and the dct_dc_size (luminance and/or chrominance) variable length codes possibly simply inspected, to determine how many bits are used to code the difference between the DCT DC coefficient of the current block and the DCT DC coefficient of the previous block of the same color component (without a need for finding out what the current DC coefficient value is nor what the difference is). This code length is compared to a threshold length to produce a bit indicating the presence or absence of an edge, Case I: code length greater than or equal to the threshold, and Case II: code length less than the threshold, respectively. There is a trade-off in selecting the threshold length. If the threshold length is too large, only the strongest edges will be detected. If the threshold length is too small, some features will mistakenly be detected as edges, i.e., the false alarm rate will increase, especially in high frequency texture areas (for example, the hair in the standard MPEG video test sequence known as "Susie"). A mid-range of values about 7, 8, or 9 for the luminance or chrominance dct_dc_sizes is a good compromise.

The edge information obtained from the threshold comparison of step 31 may not be immediately suitable for many applications, because a very large change in the value of the DC coefficient may occur over a sequence of consecutive blocks. Such a change appears in the image as a single edge feature yet the threshold comparison may produce a sequence of consecutive edge indications. In such a case it is desired to confine the edge indication to the location of the maximum gradient, i.e., to the location of the maximum rate of color (luminance and/or chrominance) change, which is at about the beginning of the block having the largest dct_dc_size value, or the longest code length. Therefore, in step 32, the edge indicating signal is applied to a thinning filter. The thinning filter compares the lengths of the dct_dc_size variable-length codes or alternatively the values of the dct_dc_size attributes for adjacent blocks. Such a thinning filter is further described below with reference to FIGS. 6 to 8. In the case of two edges that are separated by about the width or height of one 8×8 pixel block, such a thinning filter will also select the most significant of the two edges. The elimination of the less significant edge indications produces a frame of bits that is more representative of the distinctive features in the image.

The frame of bits output from the thinning filter can be further processed to produce auto-coincidence counts that are characteristics of the individual frames, and cross-coincidence counts that indicate the similarity between the contents of the current frame and the contents of other frames. The auto-coincidence counts and cross-coincidence counts are computed in a fashion similar to auto-correlation and cross-correlation. Correlation involves a summing of products, or in the case of binary signals, a summing of logic 1's produced by an exclusive-NOR function. In contrast, coincidence involves a summing of logic 1's produced by a logic AND function. In other words, what is significant for coincidence is a match of logic 1's.

One way of detecting a scene change is to compute a coincidence coefficient indicating a degree of coincidence between significant edges in a current frame and significant edges in a prior frame to within a distance of a small number of (8×8 pixel) blocks, such as 0 or 1 block. In general the number of blocks can be determined on the basis of the temporal distance between the current and the prior frames and the amount of motion in the scene in that temporal vicinity. For example, in step 33, an auto-coincidence count ($C_{cc}$) is computed for the current frame that indicates the number of significant edges that match between the current frame and a copy of it without any shift and between the current frame and its copies shifted by one block position in each of the two horizontal directions, the two vertical directions, and the four diagonal directions. A way of computing such an auto-coincidence count is described below with reference to FIG. 12. In step 34, a cross-coincidence count ($C_{cp}$) is computed that indicates the number of significant edges that match between the current frame and the prior frame without any shift and between the current frame and the copies of the prior frame shifted by one block position in each of the two horizontal directions, the two vertical directions, and the four diagonal directions. A way of computing such a cross-coincidence count is described below with reference to FIG. 12.

In step 35, the coincidence coefficient is computed by dividing the cross-coincidence count ($C_{cp}$) by the arithmetic mean of the auto-coincidence count ($C_{cc}$) for the current frame and the auto-coincidence count ($C_{pp}$) for the prior frame. In step 36, the coincidence coefficient is compared to at least one coincidence threshold to detect a scene change when the coincidence coefficient fails to reach the threshold. For example, the coincidence coefficient ranges from zero, indicating no coincidence between significant edges in the current and prior frames, to one, indicating complete coincidence between significant edges in the current and prior frames, and the coincidence threshold is about 0.3 to 0.7.

Figure 3:
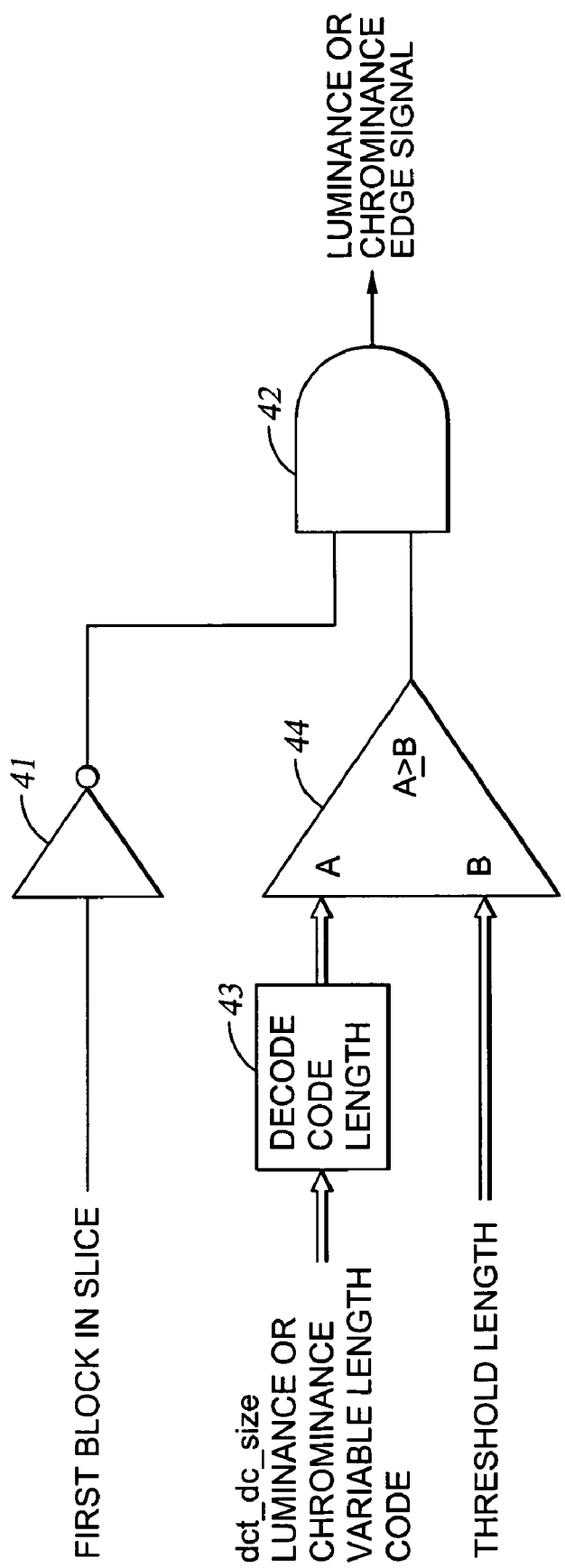
FIG. 3 is a diagram of logic for producing a luminance or chrominance edge indicating signal by comparing code lengths or values of the "dct_dc_size" luminance or chrominance attributes of each 8×8 pixel block to a threshold.

With reference to FIG. 3, there is shown logic for producing a luminance or chrominance edge signal. If the current block is the first block in the slice, then an inverter 41 and an AND gate 42 set the edge signal to a logic zero. Otherwise, a decoder 43 decodes the code length of the dct_dc_size_luminance or dct_dc_size_chrominance variable-length code. A comparator 44 compares the code length to a length threshold to produce the luminance or chrominance edge signal. The comparator 44 produces a logic 1 when the code length is equal to or greater than the length threshold.

For a color image, the logic of FIG. 3 produces three relatively independent edge signals, one for luminance and one for each of the two chrominance components Cb and Cr. In MPEG-2, the chrominance components of the video frames typically are sub-sampled with respect to luminance, so that there will be fewer chrominance edge indicating bits than luminance edge indicating bits. However, as shown in FIG. 4, it is possible to produce a combined luminance and chrominance edge signal in order to reduce the number of edge indicating bits. The logic of FIG. 4, for example, produces a number of combined luminance and chrominance edge indicating bits equal to the number of luminance edge indicating bits produced by the logic of FIG. 3. For this purpose, depending on the chrominance sub-sampling pattern, each dct_dc_size_chrominance code length from both Cb and Cr components may have to be repeatedly used with multiple dct_dc_size_luminance code lengths.

Figure 4:
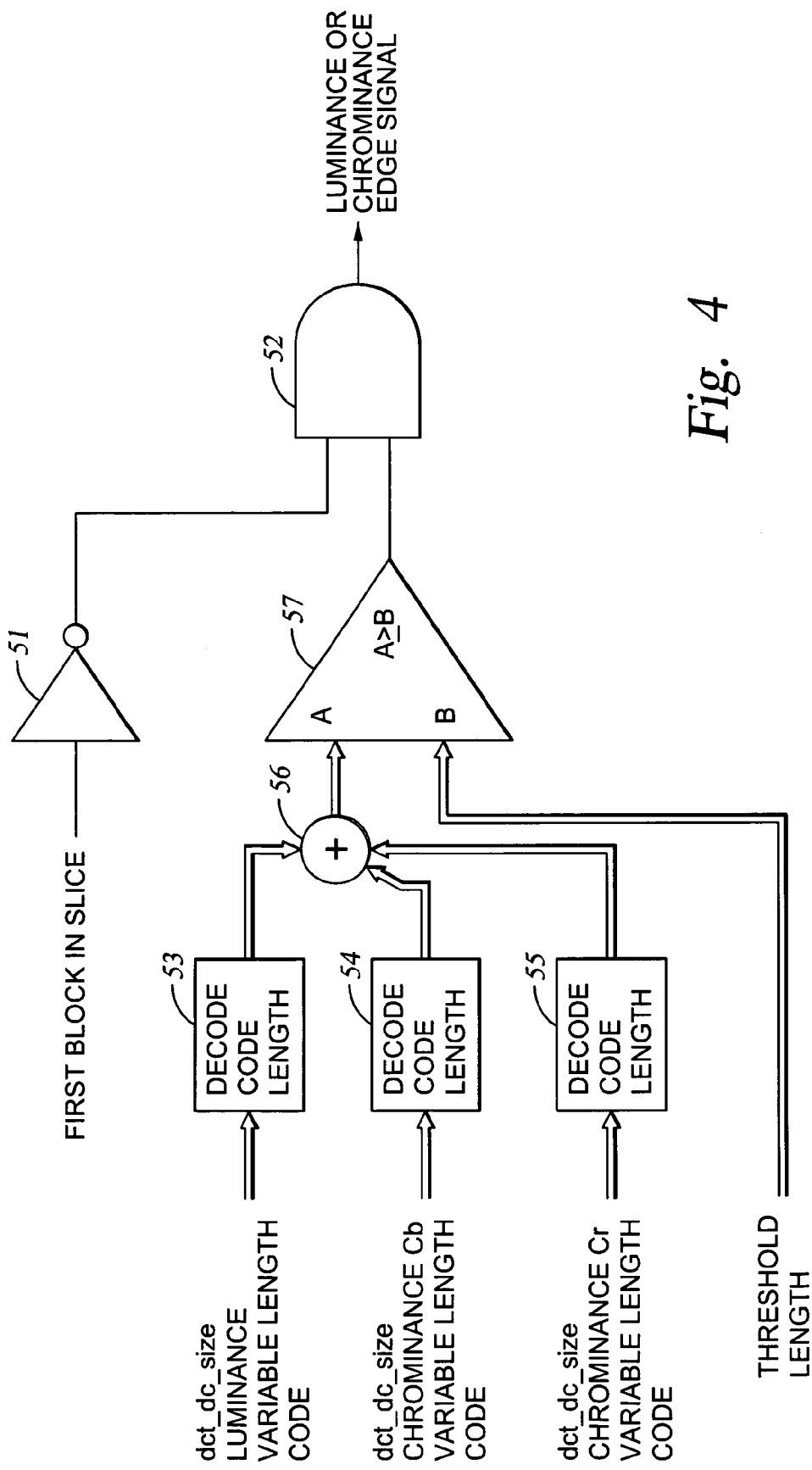
FIG. 4 is a diagram of logic for producing a combined luminance and chrominance edge indicating signal by comparing the sum of the code lengths or values of the "dct_dc_size" luminance attribute and "dct_dc_size" chrominance attributes of each 8×8 pixel block to a threshold length.

As shown in FIG. 4, an inverter 51 and an AND gate 52 set the luminance and chrominance edge signal to a logic zero for the first block in every slice. Otherwise, decoders 53, 54 and 55 decode the code length of the dct_dc_size_luminance variable-length code and the code lengths of the dct_dc_size_chrominance variable-length codes for both Cb and Cr components. An adder 56 adds the luminance code length to the chrominance code lengths to compute a combined code length. A comparator 57 compares the combined code length to a threshold length to produce the combined luminance and chrominance edge signal. The comparator 57 produces a logic 1 when the combined code length is equal to or greater than the length threshold.

Although the logic in FIG. 4 combines the luminance and chrominance code lengths by a simple addition 56, it should be apparent that the luminance and chrominance code lengths could be combined in various other ways to produce a combined code length, such as by computing a weighted arithmetic mean, a geometric mean, a sum of the squares of the luminance and chrominance code lengths, or some other average or combination of the luminance and/or chrominance code lengths.

Figure 5:
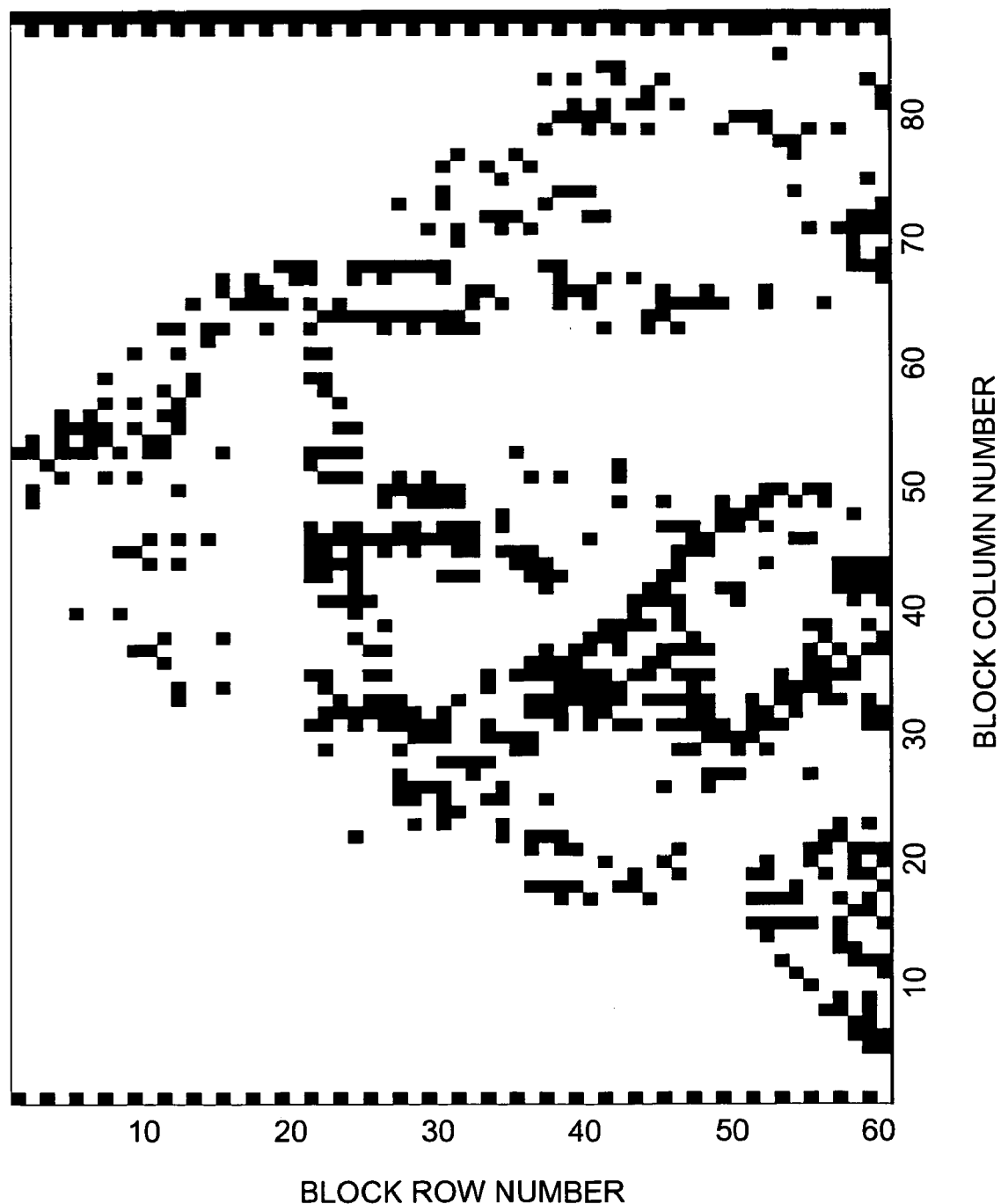
FIG. 5 is a matrix showing states of edge indicating bits produced from a frame of the MPEG-2 standard video test sequence named "Susie" by comparing the sum of the code lengths of the "dct_dc_size" luminance attribute and "dct_dc_size" chrominance attributes of each 8×8 pixel block to a threshold length of 13 bits, and in which a bit indicating an edge is shown as a black square in the matrix.

FIG. 5 shows a frame of the edge signal produced by the logic of FIG. 4 on a frame from the MPEG-2 standard video test sequence named "Susie" and a threshold length of 13 bits. A black square in a cell of the matrix in FIG. 5 indicates that the edge signal is a logic one for the 8×8 pixel block associated with that cell.

Figure 6:
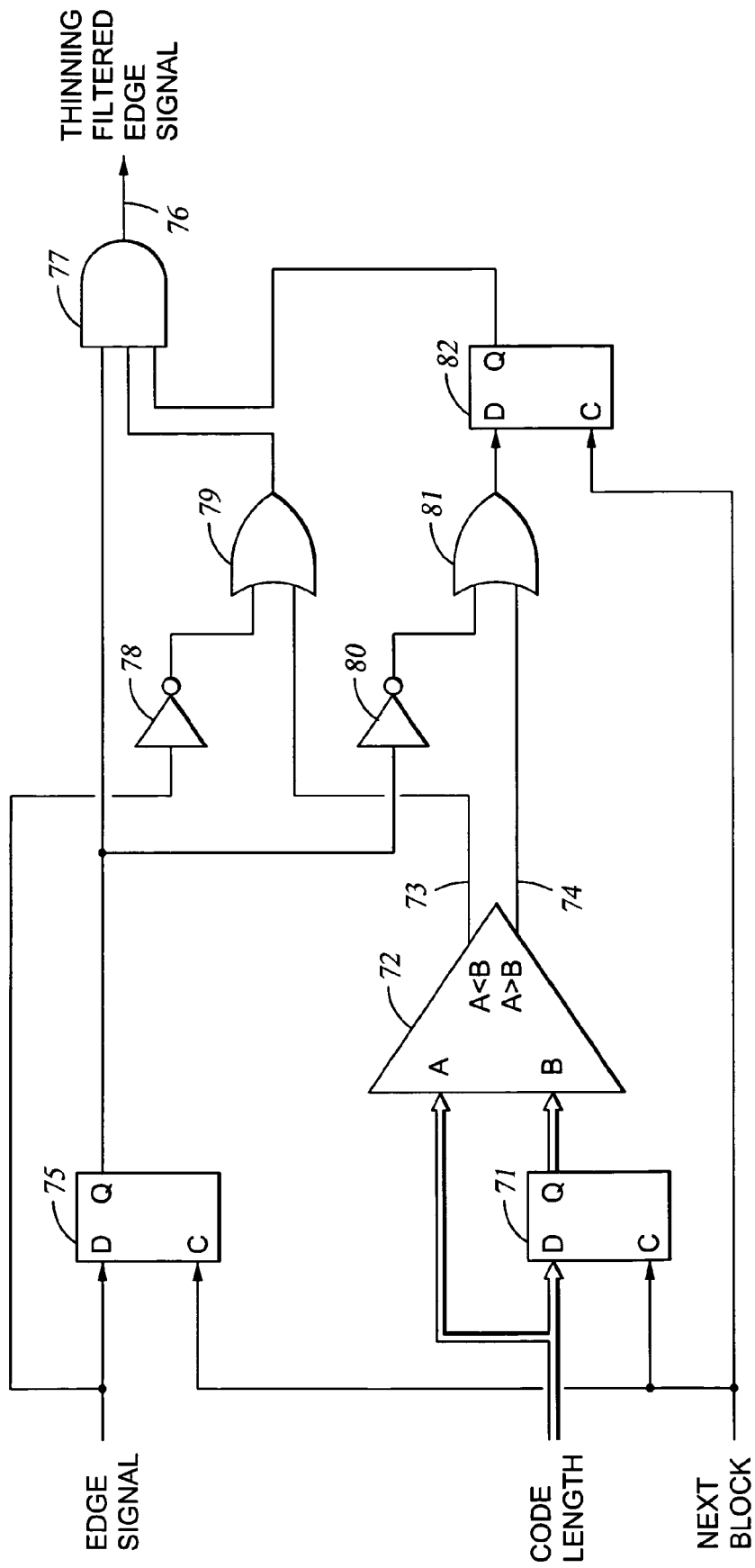
FIG. 6 is a logic diagram of a thinning filter responsive to a comparison of code lengths between a current block and a prior block.

FIG. 6 is a logic diagram of a thinning filter responsive to a comparison of the dct_dc_size code lengths between a current block and a prior block. The code length from the prior block is held in a register 71, and a comparator 72 provides a first binary output 73 that is a logic one only when the code length from the current block is less than the code length from the prior block, and a second binary output 74 that is a logic one only when the code length from the current block is greater than the code length from the prior block. The thinning filter is also responsive to the edge signal for the current block, and a single-bit register 75 holds the edge signal for the prior block. The thinning filter provides a filtered edge signal 76 from the output of an AND gate 77.

The filtered edge signal 76 is a logic one when an edge is indicated for the prior block and the prior block has a dct_dc_size code length that is not less than the dct_dc_size code length for the current block if an edge is indicated for the current block, and the prior block has a dct_dc_size code length that is not less than the dct_dc_size code length for the block just before the prior block if an edge is indicated for the block just before the prior block. An inverter 78 and an OR gate 79 provide a signal to the AND gate 77 indicating whether or not the prior block has a dct_dc_size code length that is not less than the dct_dc_size code length for the current block if an edge is indicated for the current block. An inverter 80, an OR gate 81, and a single-bit register 82 provide a signal to the AND gate 77 indicating whether or not the prior block has a dct_dc_size code length that is not less than the dct_dc_size code length for the block just before the prior block if an edge is indicated for the block just before the prior block.

Figure 7:
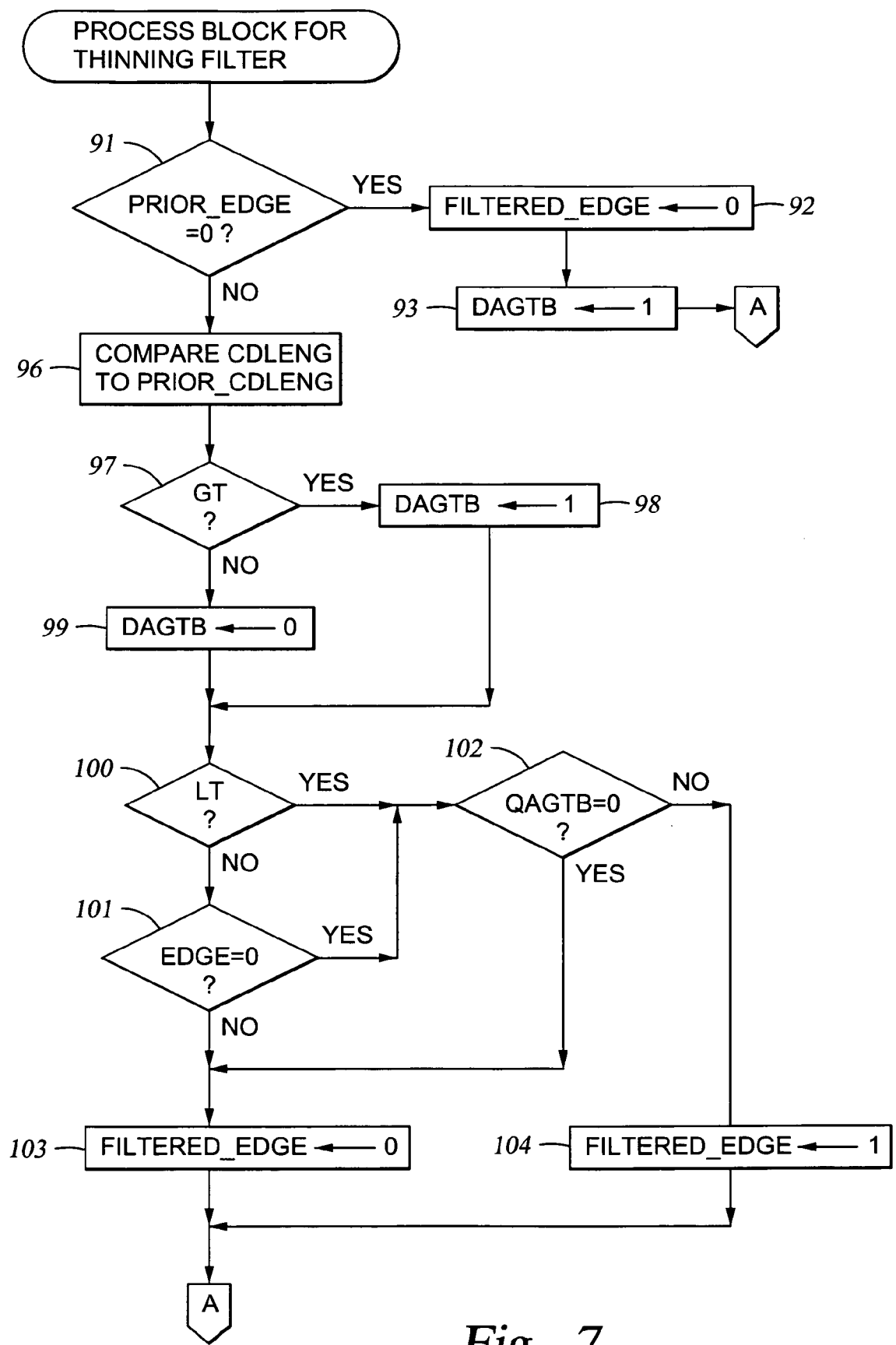
FIG. 7 is a first sheet of a flow chart of programming for a digital processor for implementing the thinning filter of FIG. 6.
Figure 8:
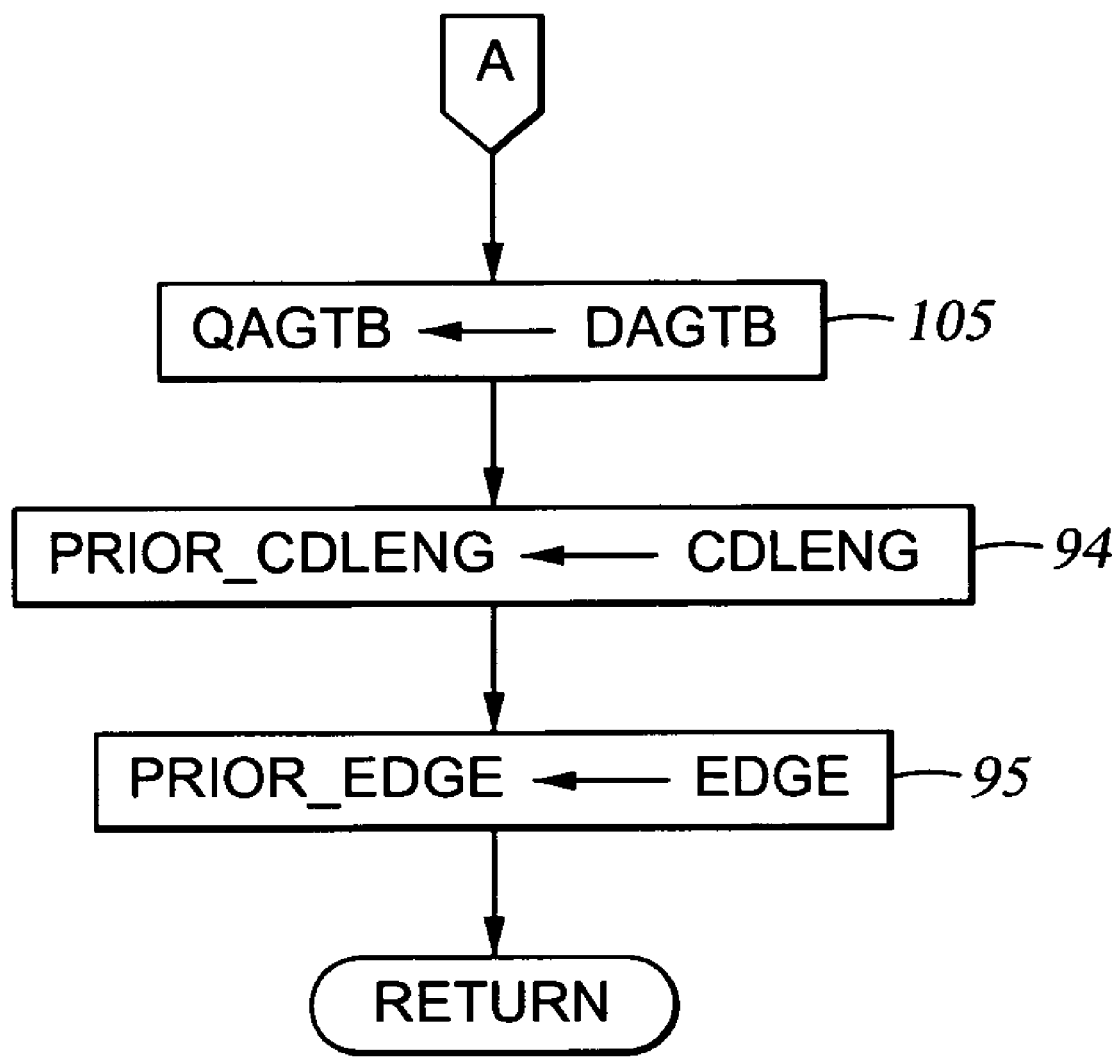
FIG. 8 is a second sheet of the flow chart begun in FIG. 7.

FIG. 7 is a first sheet of a flow chart of a program for a digital processor to implement the thinning filter of FIG. 6. In a first step 91, the processor branches to step 92 if a logical variable (i.e. a Boolean variable) "PRIOR_EDGE" (representing the output of the single-bit register 75 in FIG. 6) is zero. In step 92, the processor sets the output signal "FILTERED_EDGE" (representing the output of the AND gate 77 in FIG. 6) to zero. In step 93, the processor sets a logical variable "DAGTB" (representing the input to the single-bit register 82 in FIG. 6) to one, and execution continues in step 105 in FIG. 8. In step 105, the value of a logical variable "QAGTB" (representing the output of the single-bit register 82 in FIG. 6) is set equal to the value of the logical variable "DAGTB" and execution continues to step 94. In step 94, a variable "PRIOR_CDLENG" (representing the output of the register 71 in FIG. 6) is set to the value of "CDLENG" (representing the input to the register 71 in FIG. 6). In step 95, the logical variable "PRIOR_EDGE" is set to the value of a variable "EDGE" (representing the edge signal in FIG. 6, as produced by the edge detector of FIG. 3 or the edge detector of FIG. 4 and connected to the input of the single-bit register 75 in FIG. 6). After step 95, the computations of the thinning filter are done for the processing of the "EDGE" signal and the "CDLENG" signal for the current block.

In FIG. 7, step 91, if the processor finds that the "PRIOR_EDGE" variable is not equal to zero, execution continues to step 96. In step 96, the processor compares the value of the variable "CDLENG" (representing the dct_dc_size code length for the current block) to the value of the variable "PRIOR_CDLENG" (representing the dct_dc_size code length for the prior block). If the comparison finds that "CDLENG" is greater than "PRIOR_CDLENG," then execution branches from step 97 to step 98, to set the logical variable "DAGTB" to one. Otherwise, execution continues from step 97 to step 99, to set the logical variable "DAGTB" to zero. After steps 98 and 99, execution continues to step 100.

In step 100, execution continues to step 101 if the comparison finds that "CDLENG" is not less than "PRIOR_CDLENG." In step 101, if the edge signal "EDGE" is equal to zero, then execution branches to step 102. Execution also branches to step 102, from step 100, if the comparison finds that "CDLENG" is less than "PRIOR_CDLENG." In step 102, execution branches to step 103 if the logical variable "QAGTB" is equal to zero. Execution also continues from step 101 to step 103 if the edge signal "EDGE" is not equal to zero. In step 103, the output signal "FILTERED_EDGE" is set to zero, and execution continues to step 105 in FIG. 8. In step 102, if the logical variable "QAGTB" is not equal to zero, the execution branches to step 104. In step 104, the output signal "FILTERED_EDGE" is set to one, and execution continues to step 105 in FIG. 8. In step 105, the value of the logical variable "QAGTB" is set equal to the value of the logical variable "DAGTB," and execution continues to step 94. In step 94, the variable "PRIOR_CDLENG" is set to the value of the variable "CDLENG" and execution continues to step 95. In step 95, the logical variable "PRIOR_EDGE" is set to the value of the variable "EDGE". After step 95, the computations of the thinning filter are done for the processing of the "EDGE" and "CDLENG" signals for the current block along this alternate path of execution taken when "PRIOR_EDGE" does not compare equal to 0 at step 91.

Figure 9:
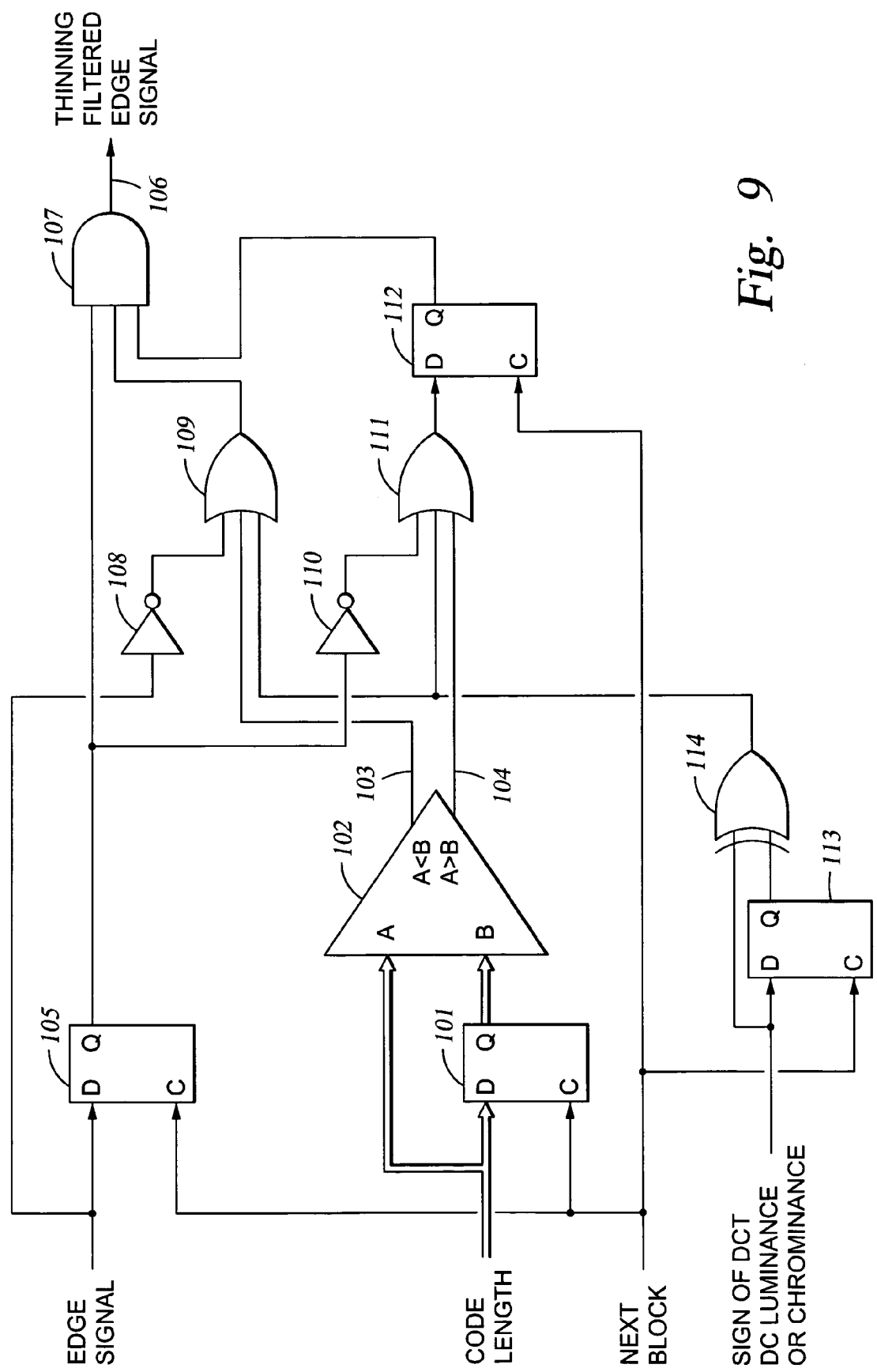
FIG. 9 is logic diagram of a thinning filter that adds logic to the thinning filter of FIG. 6 in order to retain indications of less significant edges.

FIG. 9 is a logic diagram of a thinning filter that adds logic to the thinning filter of FIG. 6 in order to retain indications of less significant edges. Components 101 to 112 in FIG. 9 are identical to components 71 to 82, respectively, in FIG. 6. The thinning filter in FIG. 9 further includes a single-bit register 113 that receives the sign of either the DCT DC luminance or chrominance (Cb or Cr) for the current block, and provides the sign of the DCT DC luminance or chrominance (Cb or Cr) of the prior block to an exclusive OR gate 114. If the edge signal received by the single-bit register 105 indicates luminance edges, then the single bit register 113 should receive the sign of the DCT DC luminance. If the edge signal received by the single-bit register 105 indicates chrominance (Cb or Cr) edges, then the single-bit register 113 should receive the sign of the DCT DC chrominance (Cb or Cr respectively). If the edge signal received by the single-bit register 105 indicates combined luminance and chrominance edges (such as the output of the edge detector in FIG. 4), then the single-bit register 113 should receive either the sign of the DCT DC luminance, or the sign of a DCT DC chrominance (Cb or Cr). When the register 113 is receiving the sign of the DCT DC luminance, the exclusive-OR gate 114 produces a logic 1 when there has been a change in the sign of the DCT DC luminance. When the register 113 is receiving the sign of a DCT DC chrominance (Cb or Cr), the exclusive-OR gate 114 produces a logic 1 when there has been a change in the sign of the same DCT DC chrominance component. In either case, when there has been such a change in sign, the logic 1 output from the exclusive-OR gate 114 is effective to inhibit any comparison from the comparator 102 from rejecting an edge indication during the filtering process. In particular, the logic 1 output from the exclusive-OR gate 114 drives the outputs of the OR gate 109 and the OR gate 111 both to logic 1.

Figure 10:
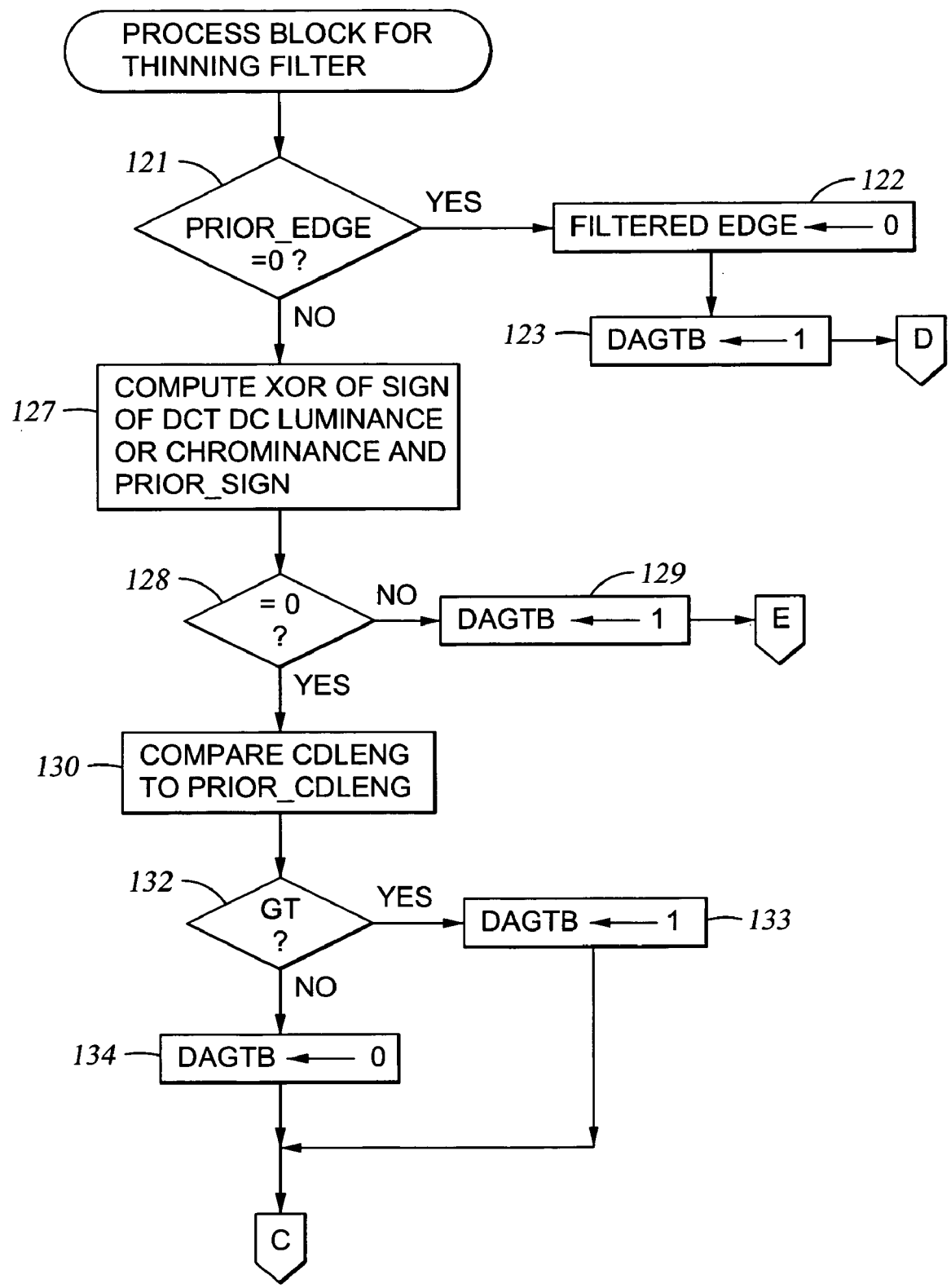
FIG. 10 is a first sheet of a flow chart of programming of a digital processor for implementing the thinning filter of FIG. 9.
Figure 11:
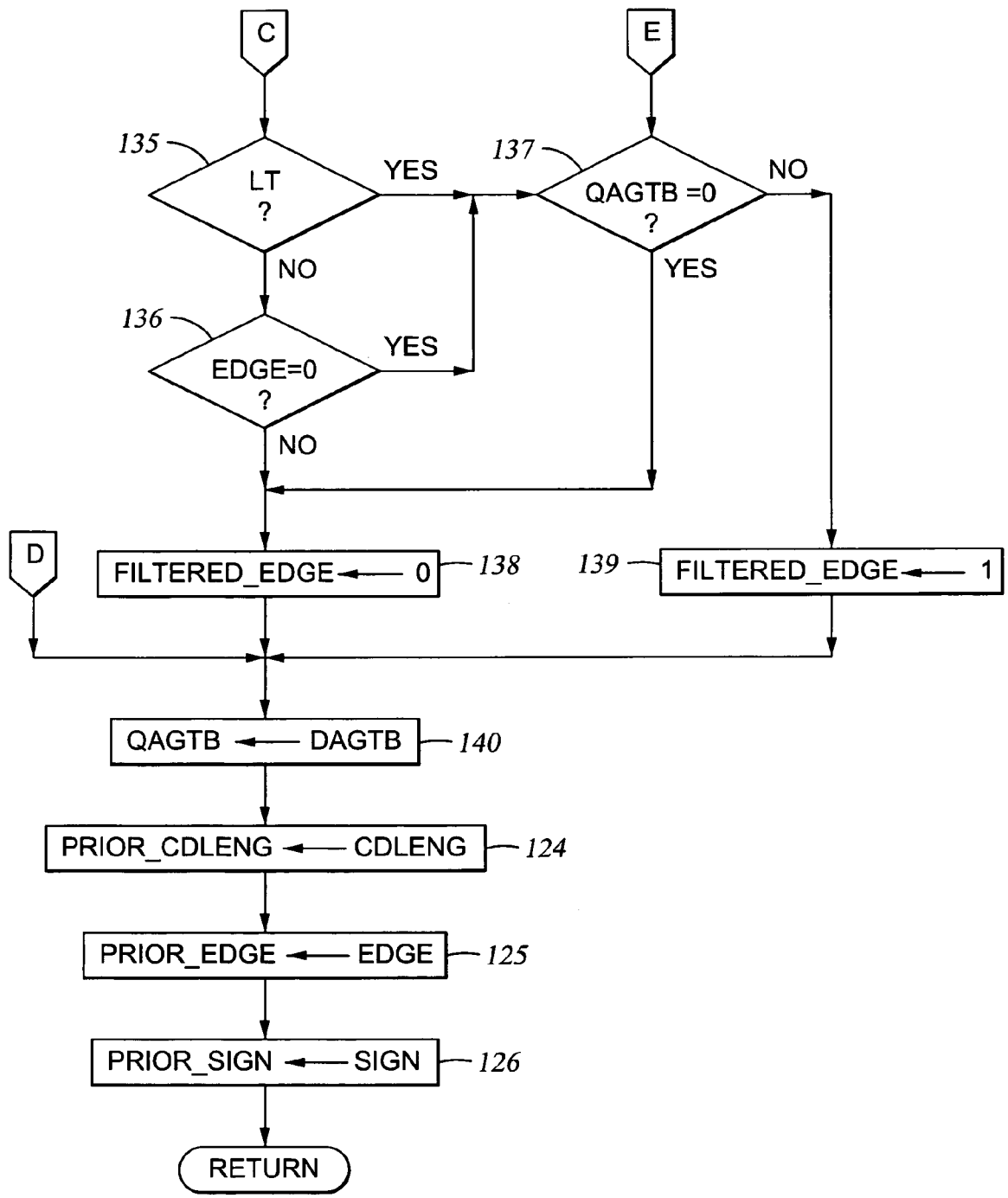
FIG. 11 is a second sheet of the flow chart begun in FIG. 10.

FIG. 10 is a first sheet of a flow chart of a program for a digital processor to implement the thinning filter of FIG. 9. Steps 121 to 123 are similar to steps 91 to 93 in FIG. 7. Execution continues from step 123 to step 140 in FIG. 11. Steps 140 and 124 to 125 in FIG. 11 are similar to steps 105 and 94 to 95 in FIG. 8. Step 126 in FIG. 11 sets a logical variable "PRIOR_SIGN" (representing the output of the single-bit register 113 in FIG. 9) to the value of a logical variable "SIGN" (representing the input to the single-bit register 113 in FIG. 9) indicating the sign of the dct_dc_luminance or dct_dc_chrominance (for Cb or Cr components), in order to implement the single-bit register 113 of FIG. 9. After step 126, execution returns.

In step 121 of FIG. 10, if the value of the logical variable "PRIOR_EDGE" is not equal to zero, then execution continues to step 127. In step 127, the processor computes the exclusive-OR of the sign of the dct_dc_luminance or dct_dc_chrominance (for Cb or Cr components) and the value of the logical variable "PRIOR_SIGN," in order to implement the exclusive-OR gate 114 in FIG. 9. In step 128, if the exclusive-OR result is not equal to zero, execution branches to step 129 to set the logical variable "DAGTB" equal to 1. After step 129, execution continues to step 137 in FIG. 11. Steps 137 to 140 in FIG. 11 are similar to steps 102 to 105 in FIGS. 7 and 8.

In step 128, if the exclusive-OR result is equal to zero, then execution continues to step 130. Steps 130, 132, 133 and 134 are similar to steps 96 to 99 of FIG. 7. After steps 133 or 134, execution continues to step 135 in FIG. 11. Steps 135 to 140 are similar to steps 100 to 105 in FIGS. 7 and 8.

Figure 12:
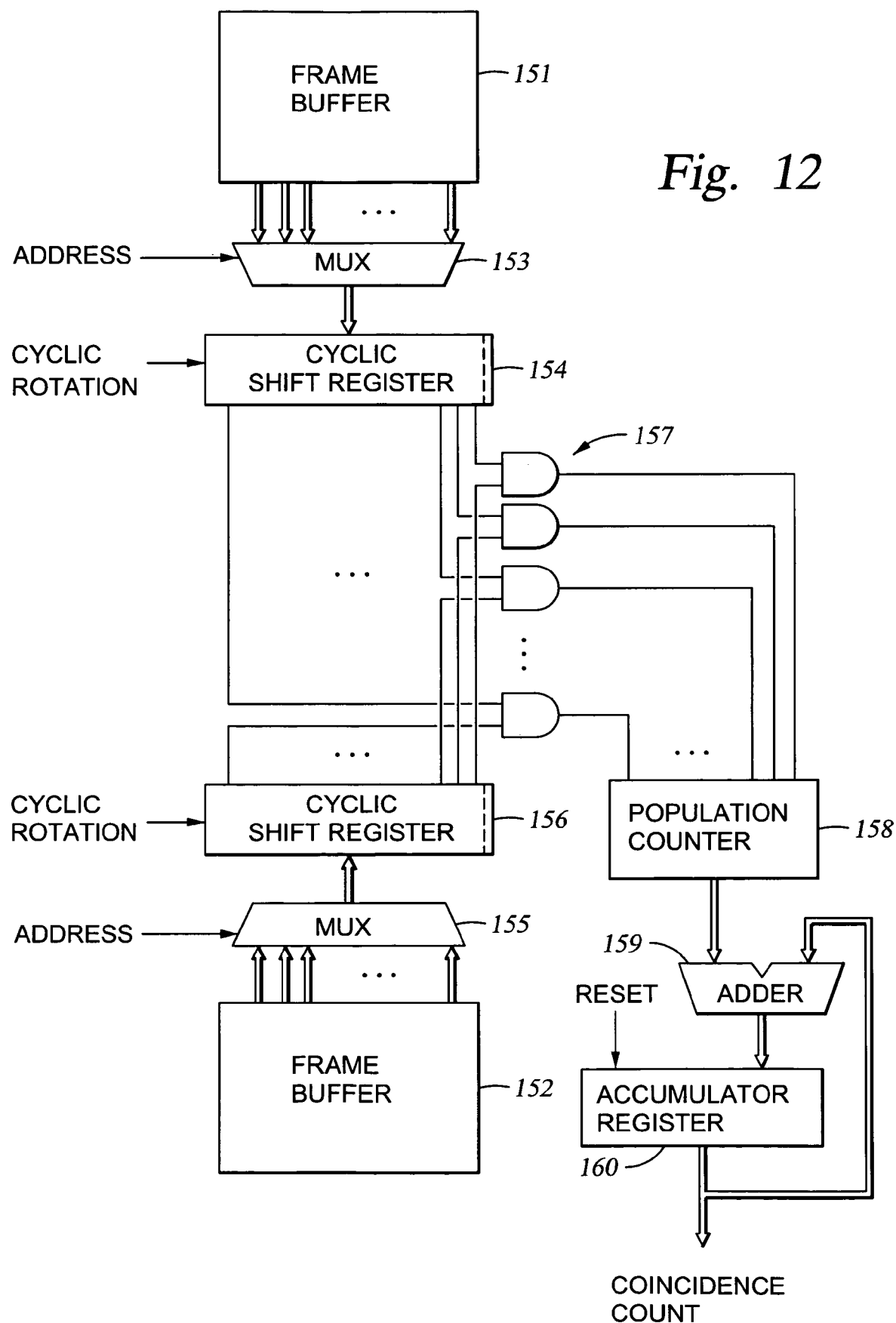
FIG. 12 is a logic diagram of circuitry for computing auto-coincidence counts and cross-coincidence counts from frames of edge indicating data.

FIG. 12 is a logic diagram of a circuitry for computing auto-coincidence counts and cross-coincidence counts from frames of edge indicating data. The coincident count is computed between a frame of data in a first frame buffer 151 and a frame of data in a second frame buffer 152. For a cross-coincident count, the data in the first frame buffer 151 are different from the data in the second frame buffer 152.

For an auto-coincidence count, the data in the first frame buffer 151 are the same as the data in the second frame buffer 152.

The circuitry of FIG. 12 successively compares selected bytes or words of data from the first frame buffer 151 to selected bytes or words of data from the second frame buffer 152. A first multiplexer 153 selects an addressed byte or word from the first frame buffer 151 and loads the addressed byte or word into a first (cyclic) shift register 154. A second multiplexer 155 selects an addressed byte or word from the second frame buffer 152 and loads the addressed byte or word into a second (cyclic) shift register 156. An array of AND gates 157 compare bits of a byte or word in the first shift register 154 to corresponding bits of a byte or word in the second shift register 156. A population counter 158 computes the number of logic 1's produced by the AND gates. The population counter 158, for example, is comprised of an array of full adders, or a memory programmed with a look-up table. An adder 159 adds the number from the population counter to the output of accumulator register 160 to accumulate a coincidence count.

The circuitry of FIG. 12 can be implemented by suitable programming of a general purpose digital processor. If the general purpose digital processor does not have a machine instruction providing a population count function, then the population count function can be implemented by a look-up table in random access memory. A 256 entry look-up table with 4 bits of storage per entry, is sufficient for computing the population count of a byte of data from the logical AND of a single byte in the first shift register 154 to a single byte in the second shift register 156. Following is a pseudo-code listing for the programming of a general-purpose digital processor for computing the auto-coincidence counts of step 33 in FIG. 2 or the cross-coincidence count of step 34 in FIG. 2. For the auto-coincidence count of step 33, FRAME1 is the same as FRAME2. For the cross-coincidence count of step 34, FRAME1 is different from FRAME2.

```
/* FRAME HAS "M" ROWS AND "N" COLUMNS OF         */
8 × 8 BLOCKS
/* THE EDGE INDICATING BIT FOR THE FIRST BLOCK IN */
EACH
/* ROW IS LEFT-JUSTIFIED TO THE LEAST SIGNIFICANT BIT  /*
/* POSITION. THE FRAME BUFFER BYTE CONTAINING THE     */
/* EDGE INDICATING BIT FOR THE LAST BLOCK IN EACH     */
ROW
/* HAS ITS MOST SIGNIFICANT BITS ZERO-FILLED IF THE   */
/* NUMBER OF BLOCKS PER ROW IS NOT A MULTIPLE OF      */
/* EIGHT. THEREFORE THE FRAME BUFFER HAS "M" ROWS     */
/* OF BYTES AND "P" COLUMNS OF BYTES WHERE "P" IS     */
/* THE NUMBER OF BYTES PER ROW COMPUTED AS:       */
/*                                                   */
/* P = INT(N/8)                                      */
/* IF (REM(N/8).NE.0) THEN P = P + 1                 */
/* WHERE THE INT(.) FUNCTION RETURNS THE INTEGER     */
PART
/* OF ITS FLOATING POINT ARGUMENT AND THE            */
FUNCTION
/* REM(.) RETURNS THE REMAINDER OF ITS ARGUMENT      */
/* WHICH IS IN THE FORM OF A RATIO OF INTEGERS.      */
/* BEGIN COINCIDENCE COUNT CALCULATION    */
CLEAR ACCUMULATOR (OF SIZE (INT( LOG_2
(9*M*P)) + 1) BITS)
FOR I = 2 TO M−1
FOR K = 1 TO 3
CLEAR CYCLIC SHIFT_REGISTER_1 (OF SIZE 9 BITS)
CLEAR CYCLIC SHIFT_REGISTER_2 (OF SIZE 9 BITS)
FOR J = 1 TO P
BYTE_ADDR_1 = ((I − 1) * P) + J
BYTE_ADDR_2 = ((I + K − 3) * P) + J
```

-continued

```
/* LOAD SHIFT_REGISTER_1 AND SHIFT_REGISTER_2 */
/* IN THE FOLLOWING LOAD OPERATIONS ALL 9 BITS OF      */
THE
/* SHIFT REGISTER UNDER CONSIDERATION ARE LOADED;      */
/* THE LEFTMOST (LEAST SIGNIFICANT) 8 BITS ARE         */
LOADED
/* WITH THE ADDRESSED BYTE; AND THE REMAINING          */
/* RIGHTMOST (MOST SIGNIFICANT) 1 BIT IS LOADED WITH   */
/* THE LEAST SIGNIFICANT BIT OF THE NEXT BYTE ON THE   */
/* SAME ROW                                            */
SHIFT_REGISTER_1 = FRAME1(BYTE_ADDR_1)
SHIFT_REGISTER_2 = FRAME2(BYTE_ADDR_2)
/* DO HORIZONTALLY ALIGNED COMPARISON */
/* IN ALL CONSEQUENT LOGICAL "AND" OPERATIONS,         */
ONLY
/* THE LEFTMOST (LEAST SIGNIFICANT) 8 BITS OF BOTH     */
/* REGISTERS ARE INVOLVED TO PRODUCE AN 8 BIT          */
RESULT
/* (INDEX)                                             */
INDEX = SHIFT_REGISTER_1.AND.SHIFT_REGISTER_2
INCREMENT = POPULATION_COUNT_FUNCTION(INDEX)
ACCUMULATOR = ACCUMULATOR + INCREMENT
/* DO COMPARISON WITH ONE BLOCK HORIZONTAL             */
SHIFT OF
/* FRAME 1 TO THE LEFT WITH RESPECT TO FRAME 2         */
CYCLICLY ROTATE SHIFT_REGISTER_1 LEFT BY ONE BIT
INDEX = SHIFT_REGISTER_1.AND.SHIFT_REGISTER_2
INCREMENT = POPULATION_COUNT_FUNCTION(INDEX)
ACCUMULATOR = ACCUMULATOR + INCREMENT
/* RESTORE SHIFT_REGISTER_1 TO ORIGINAL STATE */
CYCLICLY ROTATE SHIFT_REGISTER_1 RIGHT BY ONE BIT
/* DO COMPARISON WITH ONE BLOCK HORIZONTAL
SHIFT OF */
/* FRAME2 TO THE LEFT WITH RESPECT TO FRAME 1          */
CYCLICLY ROTATE SHIFT_REGISTER_2 LEFT BY ONE BIT
INDEX = SHIFT_REGISTER_1.AND.SHIFT_REGISTER_2
INCREMENT = POPULATION_COUNT_FUNCTION(INDEX)
ACCUMULATOR = ACCUMULATOR + INCREMENT
/* RESTORE SHIFT_REGISTER_2 TO ORIGINAL STATE */
CYCLICLY ROTATE SHIFT_REGISTER_2 RIGHT BY ONE BIT
NEXT J
NEXT K
NEXT I
```

If it is desired to detect changes between the contents of frames regardless of possibly extensive (more than one 8×8 pixel block in all possible horizontal, vertical and diagonal directions) translations of objects in the frames, it may be more desirable to compute the variance between the auto-coincidence matrices of the frames rather than the cross-coincidence counts between the frames. The auto-coincidence matrix of a frame is a matrix of auto-coincidence counts for the frame. The auto-coincidence count in the cell (m, n) of the auto-coincidence matrix is the count of matches between the frame and the same frame shifted by m rows and n columns. The counts in the auto-coincidence matrix for limited ranges of m and n, for example, m=0, 1, 2, ..., M and n=0, 1, 2, ..., N for relatively small values of M and N such as M=3 and N=3 provide a way of identifying the frame. These counts are relatively independent of the translation of the frame as a whole and are also relatively independent of the translation of objects in the frame so long as the objects do not completely overlap each other. The counts could be computed for each I-frame of an MPEG-2 clip and stored as part of the metadata of the clip.

Figure 13:
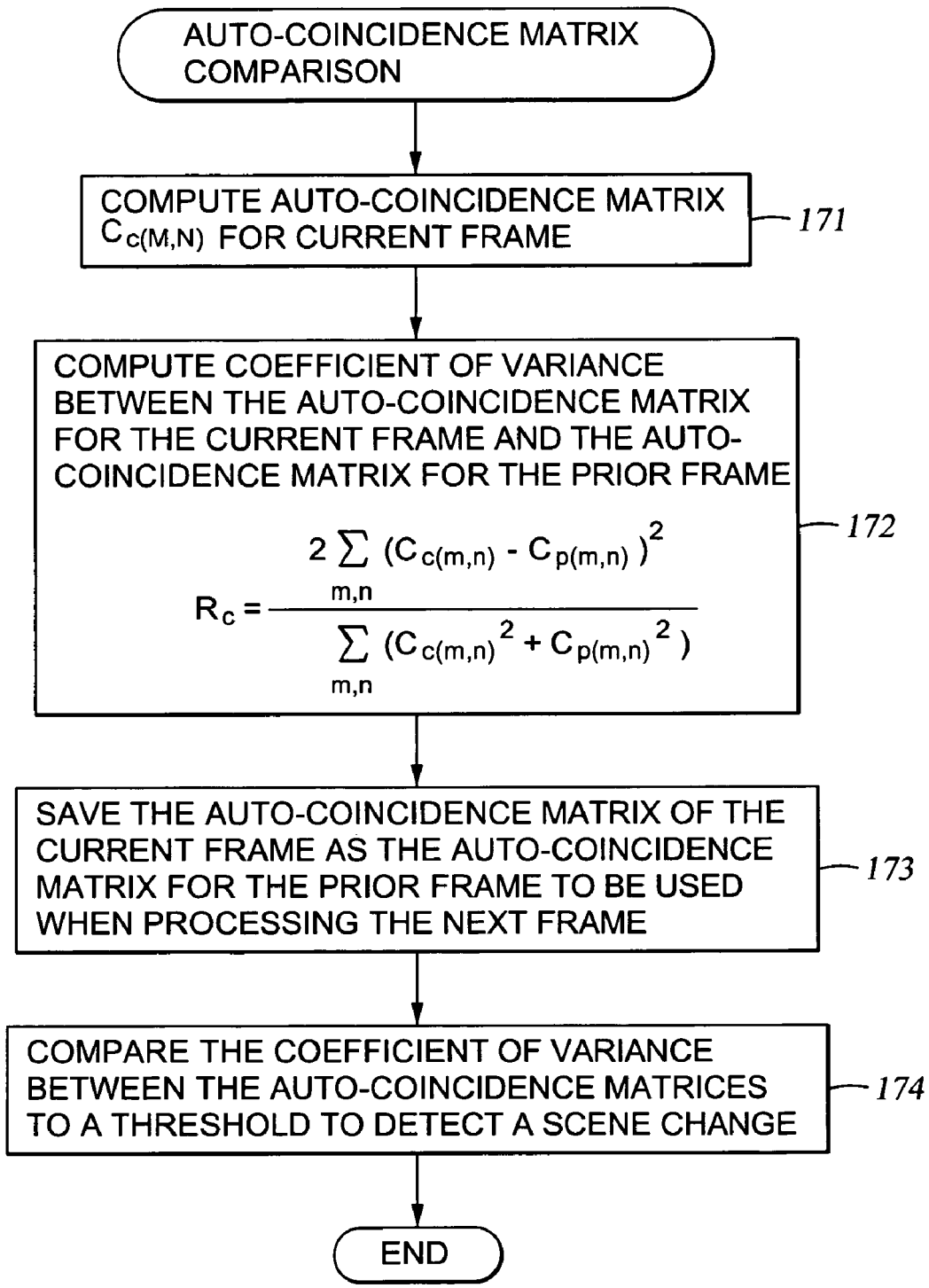
FIG. 13 is a flow chart showing the comparison of an auto-coincidence matrix for edge indicating data of a current frame to an auto-coincidence matrix for edge indicating data of a prior frame for detection of a scene change.

FIG. 13 is a flow chart showing the comparison of an auto-coincidence matrix for edge indicating data of a current frame to an auto-coincidence matrix for edge indicating data of a prior frame for detection of a scene change. In a first step 171, the processor computes the auto-coincidence matrix $C_{c(M,N)}$ for the current frame. In step 172, the processor computes a coefficient of variance between the auto-coincidence matrix $C_{c(M,N)}$ for the current frame and the auto-coincidence matrix $C_{p(M,N)}$ for the prior frame. In step 173, the processor saves the auto-coincidence matrix of the current frame as the auto-coincidence matrix for the prior frame in order to be used when processing the next frame. In step 174, the processor compares the coefficient of variance between the auto-coincidence matrices to a threshold to detect a scene change when the coefficient of variance is equal to or greater than the threshold. For example, the coefficient of variance varies from 0 for no variance to 1 for complete variance, and the threshold is about 0.2 to 0.6.

Unless there is a scarcity of computational resources, it is desirable to use information about the gradient or orientation of the edges in order to better distinguish a scene change from change in frames due to some motion of the background or objects in a frame or due to changes in lighting conditions between frames. It is most desirable to provide additional independent bits or channels of bits in such a way that the frame of the bits for each channel will be relatively sparse. Under these conditions, there will be a greater variance between the auto-coincidence matrix elements of different frames for relatively small values of m and n.

One way of distinguishing edges is based on the signs of the horizontal and/or vertical components of the gradient (vector) for each edge, as indicated by the sign of the differential DCT DC ($C_{00}$) coefficient and the block scan direction reaching the block containing this coefficient. For example, for a luminance edge, it is the sign of the DCT $C_{00}$ coefficient for luminance and the direction along which the prediction is performed to produce this coefficient; for a chrominance edge, it is the sign of the DCT $C_{00}$ coefficient for the same chrominance channel and the prediction direction for this coefficient; and for a combination luminance and chrominance edge, it is the sign of the DCT $C_{00}$ coefficient for luminance and the prediction direction for this coefficient. In any of these cases, the sign is very distinctive because the magnitude of the DCT $C_{00}$ coefficient, as classified by the value of "dct_dc_size," is at least as large as the threshold for edge detection.

Figure 14:
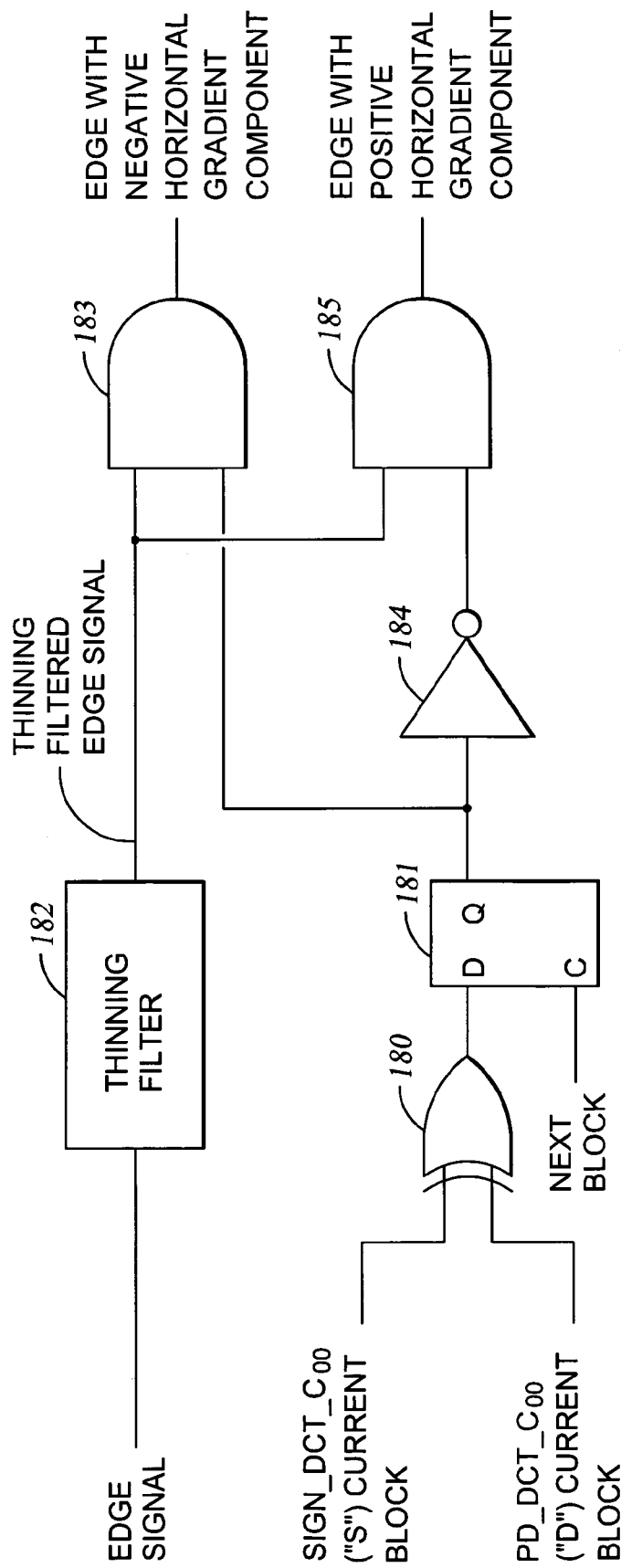
FIG. 14 is a logic diagram of circuitry for producing two separate channels of edge indicating data, including a first channel of bits indicating edges having a negative gradient in the horizontal direction, and a second channel of bits indicating edges having a positive gradient in the horizontal direction.

FIG. 14 shows how the sign of the DCT $C_{00}$ coefficient and the direction in which it was predicted can be used to split the thinning filtered edge signal into two independent channels, one providing bits indicating edges with a negative horizontal gradient component, and one providing bits indicating edges with a positive horizontal gradient component. An exclusive-OR gate 180 produces a logical signal representing the sign of the horizontal component of the local edge gradient ("0" for positive and "1" for negative) based on its two inputs SIGN_DCT_$C_{00}$ and PD_DCT_$C_{00}$, respectively the sign and the prediction direction of the current block's differential DCT DC coefficient. The logical value of PD_DCT_$C_{00}$ depends on block position in one of three scan sequences for the particular chrominance sub-sampling method, as described further below with reference to FIGS. 15 to 17. A single-bit register 181 provides a delay of the sign of the horizontal gradient component corresponding to the delay of the edge signal through the thinning filter 182, which is the thinning filter of FIG. 6 or the thinning filter of FIG. 9. An AND gate 183 combines the delayed sign of the horizontal gradient component from the single-bit register 181 with the thinning filtered edge signal from the thinning filter 182 to produce a signal indicating edges with a negative horizontal gradient component. An inverter 184 inverts the delayed sign of the horizontal gradient component from the single-bit register 181. An AND gate 185 combines the output of the inverter 184 with the thinning filtered edge signal from the thinning filter 182 to produce a signal indicating edges with a positive horizontal gradient component.

Figure 15:
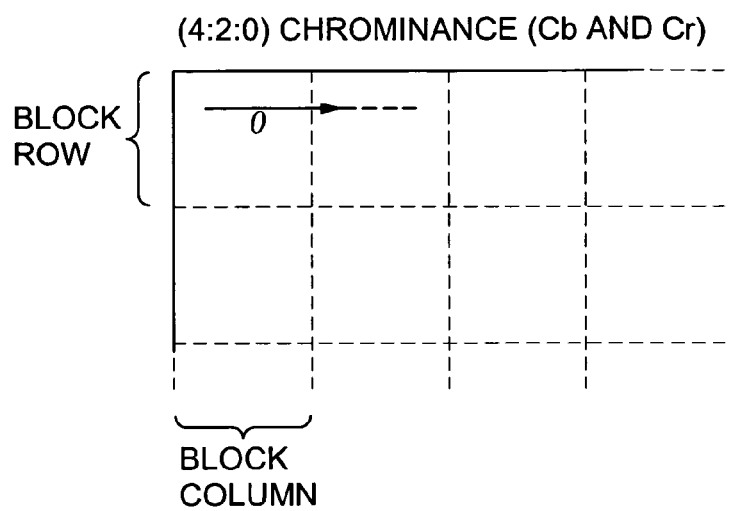
FIG. 15 shows a block scanning sequence for (4:2:0) chrominance encoding.

FIG. 15 shows how the logical value of PD_DCT_$C_{00}$ depends on block position in the scan sequence for (4:2:0) chrominance (Cb and Cr). In this case, the scan order is a simple raster scan, and the value of PD_DCT_$C_{00}$ is a constant logic zero.

Figure 16:
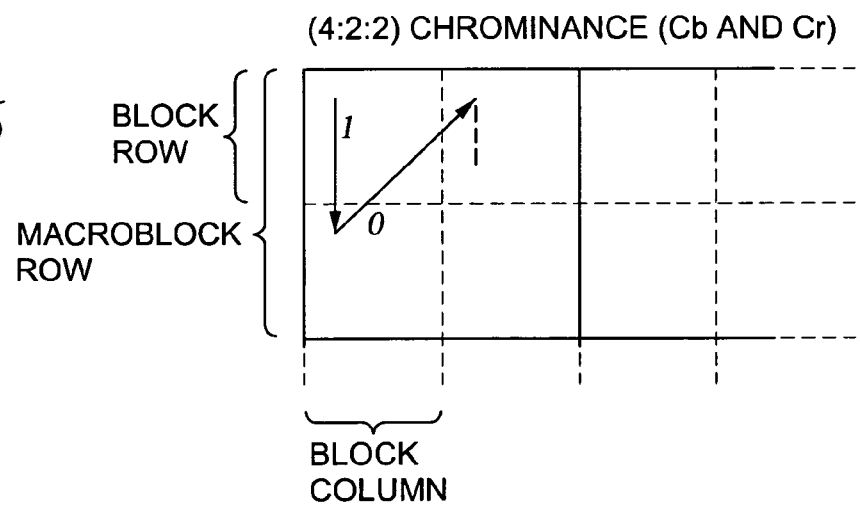
FIG. 16 shows a block scanning sequence for (4:2:2) chrominance encoding.

FIG. 16 shows how the logical value of PD_DCT_$C_{00}$ depends on block position in the scan sequence for (4:2:2) chrominance (Cb and Cr). In this case, the scan order is a simple saw-tooth pattern. The value of PD_DCT_$C_{00}$ is a sequence of 101010 . . . .

Figure 17:
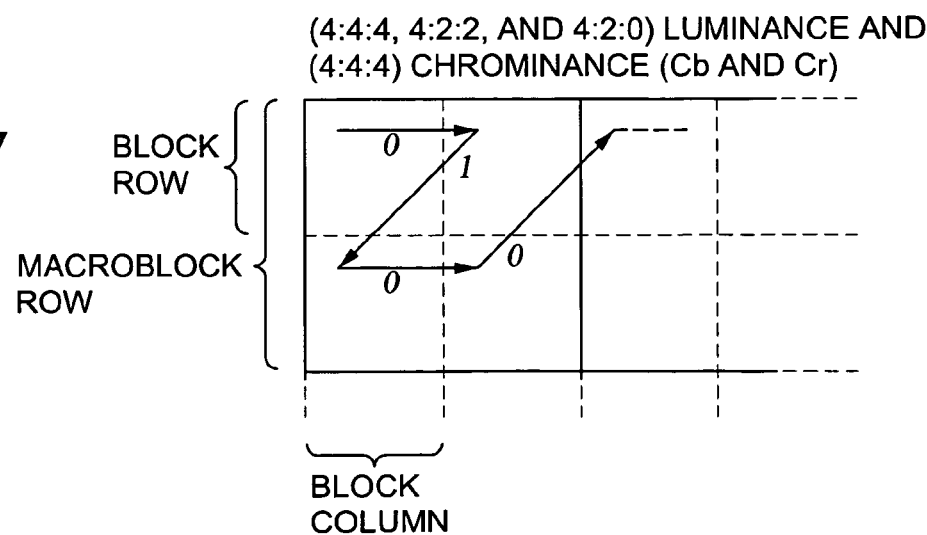
FIG. 17 shows a block scanning sequence for (4:4:4, 4:2:2, and 4:2:0) luminance and (4:4:4) chrominance encoding.

FIG. 17 shows how the logical value of PD_DCT_$C_{00}$ depends on block position in the scan sequence for (4:4:4, 4:2:2, and 4:2:0) luminance and (4:4:4) chrominance (Cb and Cr). In this case, the scan order is rather complex, including one step backward (where PD_DCT_$C_{00}$ has a value of logic 1) for every three steps forward (where PD_DCT_$C_{00}$ has a value of logic 0). In other words, the value of PD_DCT_$C_{00}$ is a sequence of 0100010001000100 . . . .

Figure 18:
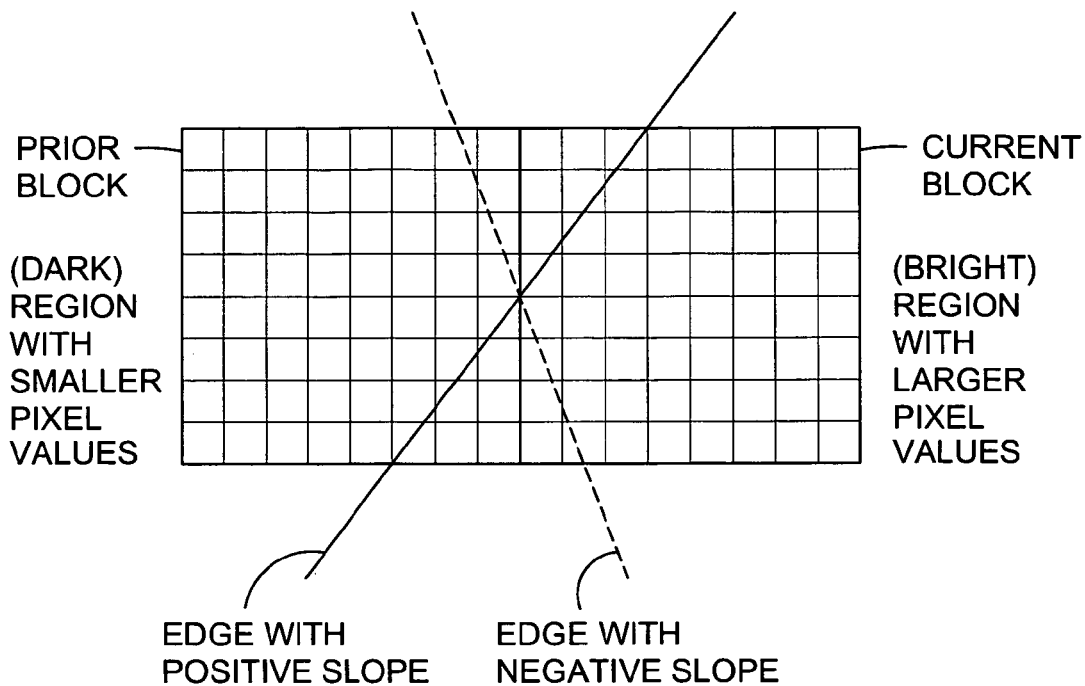
FIG. 18 is a diagram showing an edge with a positive or negative slope and a positive horizontal gradient in pixel values between a current block and a prior block.
Figure 19:
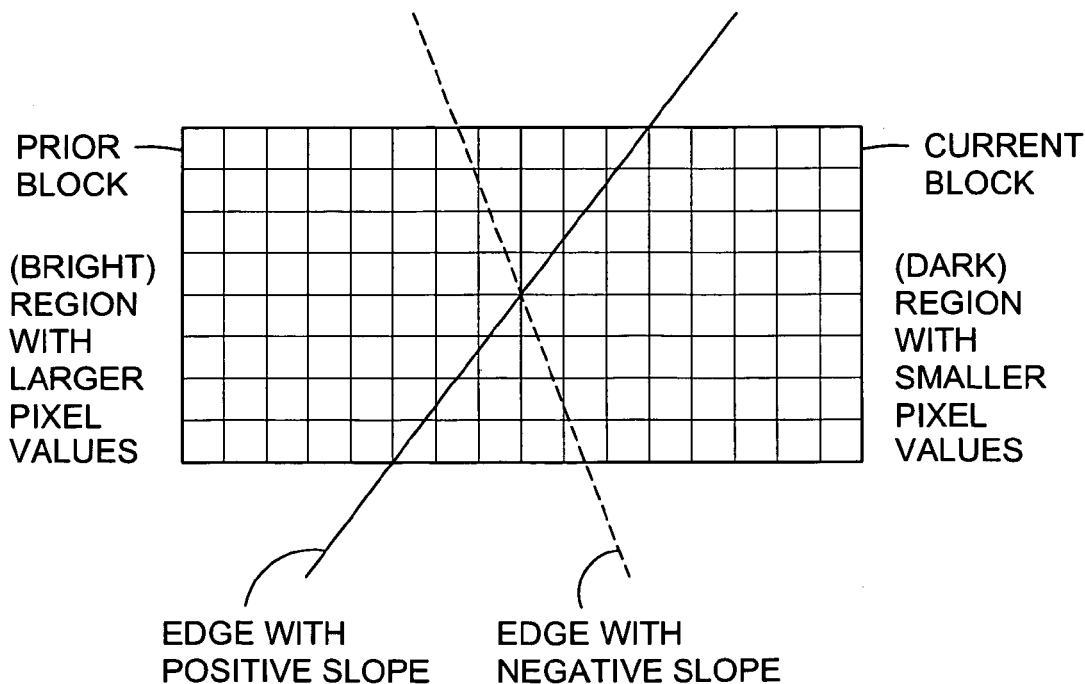
FIG. 19 is a diagram showing an edge with a positive or negative slope and a negative horizontal gradient in pixel values between a current block and a prior block.
Figure 20:
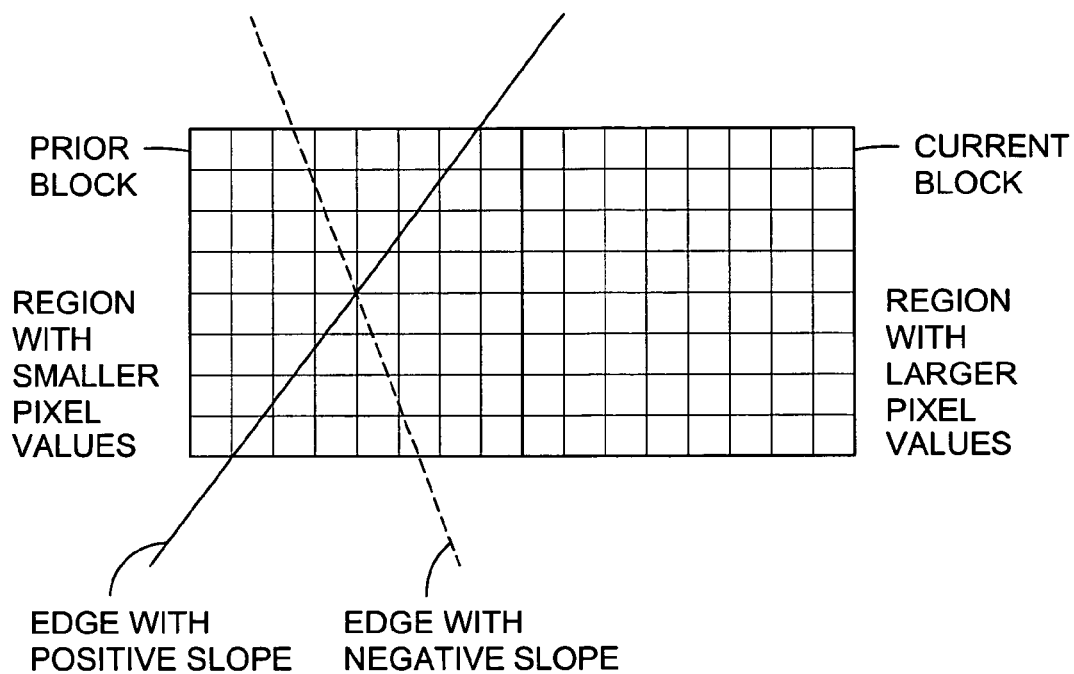
FIG. 20 is a diagram showing an edge with a positive or negative slope and a positive horizontal gradient in pixel values within a prior block.
Figure 21:
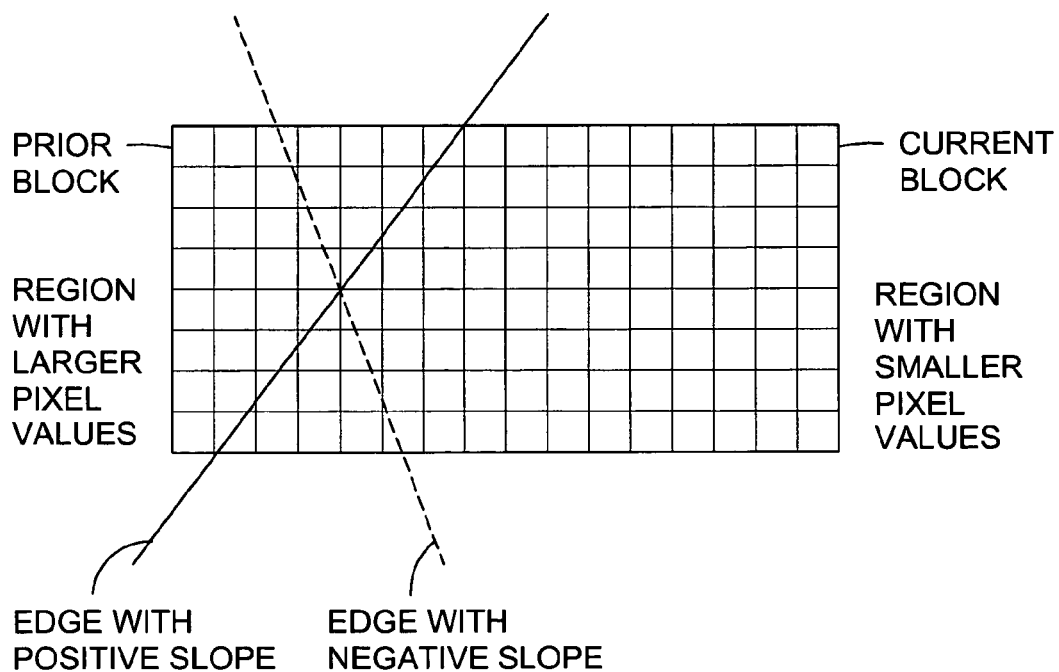
FIG. 21 is a diagram showing an edge with a positive or negative slope and a negative horizontal gradient in pixel values within a prior block.
Figure 22:
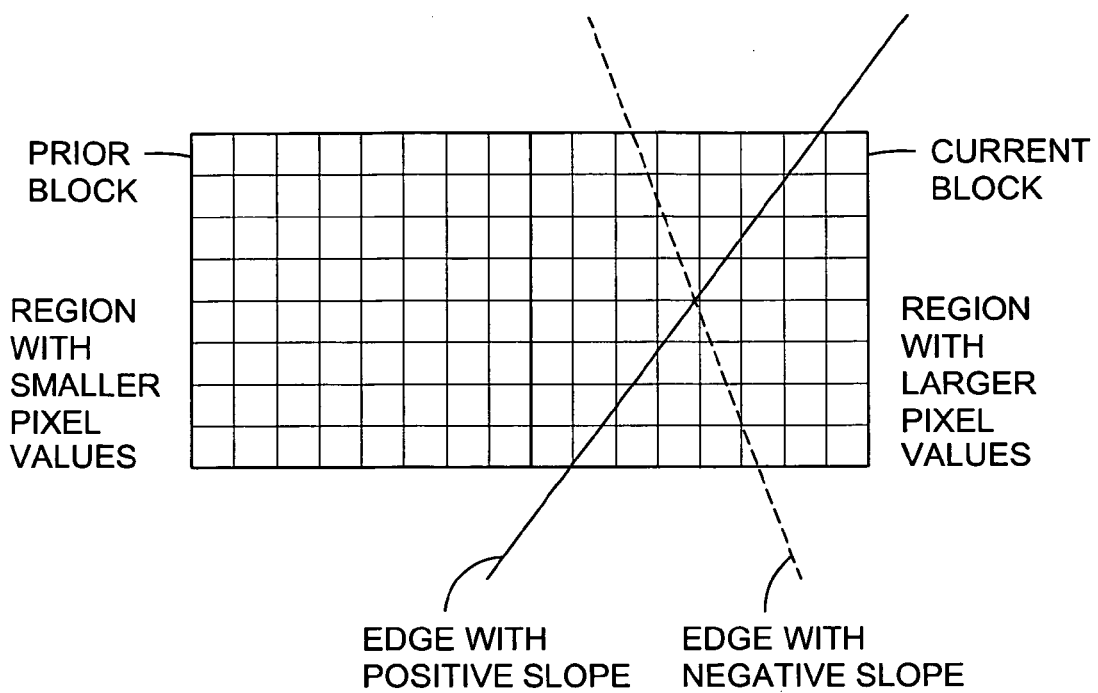
FIG. 22 is a diagram showing an edge with a positive or negative slope and a positive horizontal gradient in pixel values within a current block.
Figure 23:
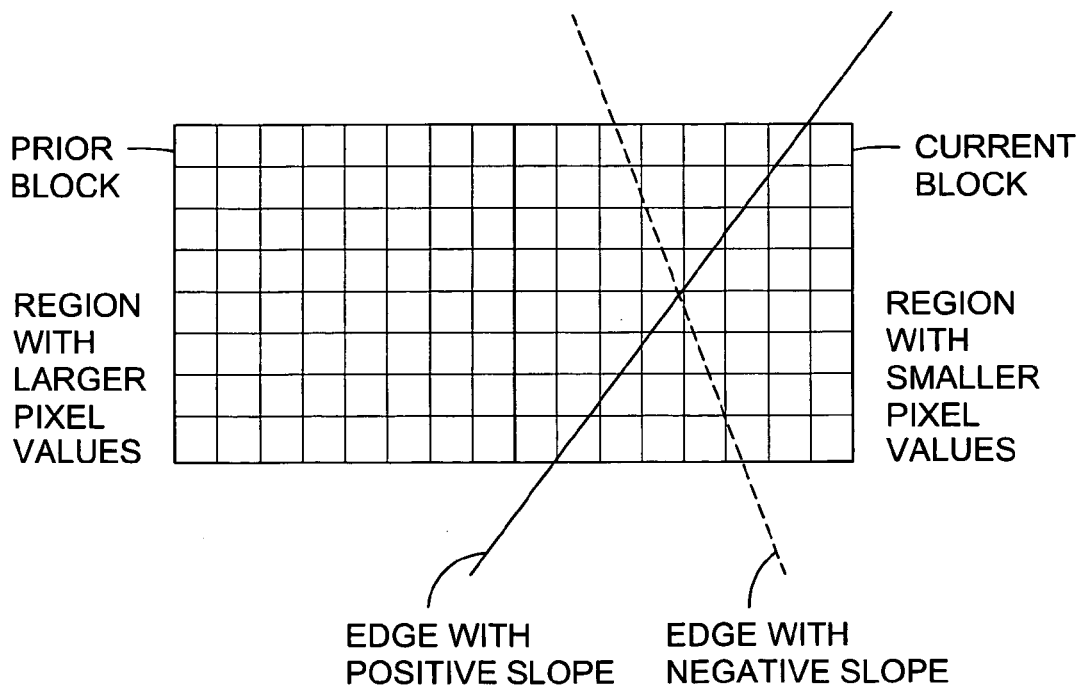
FIG. 23 is a diagram showing an edge with a positive or negative slope and a negative horizontal gradient in pixel values within a current block.

Another source of additional information about the edges is the sign and magnitude of the lowest (horizontal and vertical) frequency DCT AC coefficients. Vertically and horizontally oriented edges depending on their contrast levels, respectively induce horizontal and vertical frequency components. For example, FIG. 18 shows an idealized case of a close-to-vertical edge with a positive horizontal gradient component (pixel values increasing towards right) being detected by an edge signal that is a logic 1 for a current block, and FIG. 19 shows an idealized case of another close-to-vertical edge with a negative horizontal gradient component (pixel values decreasing towards right) being detected by an edge signal that is a logic 1 for a current block. In each of these idealized (due to their involving an ideal step-edge) cases, the edge is centered almost right at the vertical boundary between the current block and the prior block. The discontinuity of the edge is predominantly confined to neither the current block nor the prior block. Therefore the contents of both the current block and the prior block are predominantly low-pass (smooth) and the existence of a vertical edge between the blocks for the case illustrated in FIG. 18 and FIG. 19 will be revealed only through a significant change in the mean pixel value from the prior to the current block or equivalently a large magnitude differential DCT DC ($C_{00}$) coefficient in the current block. As long as the edges of FIG. 18 and FIG. 19 are close to being vertical and located almost at the vertical boundary between the prior and current blocks, the exact values of their slopes are immaterial to the above observation. As the almost vertical edges of FIG. 18 or FIG. 19 shift into either the prior block or the current block as illustrated in FIGS. 20 and 21 or FIGS. 22 and 23, respectively, the difference in the mean pixel values of the prior and the current block or equivalently the magnitude of the differential DCT DC ($C_{00}$) coefficient in the current block decreases. To detect such edges without too much decreasing the threshold on dct_dc_size_luminance or dct_dc_size_chrominance which will increase the noise in the edge signal, and/or to achieve more precise vertical edge localization whenever it is required, the magnitude and the sign of the lowest order AC horizontal frequency coefficient ($C_{01}$) can be inspected in both the prior block and the current block. Whether or not there is a vertical edge within the bounds of the prior block or the current block not aligned with the vertical boundary between these two blocks, should be indicated by whether or not there is a lowest order AC horizontal frequency coefficient ($C_{01}$) with considerable magnitude in either of the two blocks, and if there is a lowest order AC horizontal frequency coefficient ($C_{01}$) with considerable magnitude in either of the two blocks, then the sign of this lowest order AC horizontal frequency coefficient ($C_{01}$) should indicate whether the gradient of the vertical edge is positive or negative in the horizontal direction.

Figure 24:
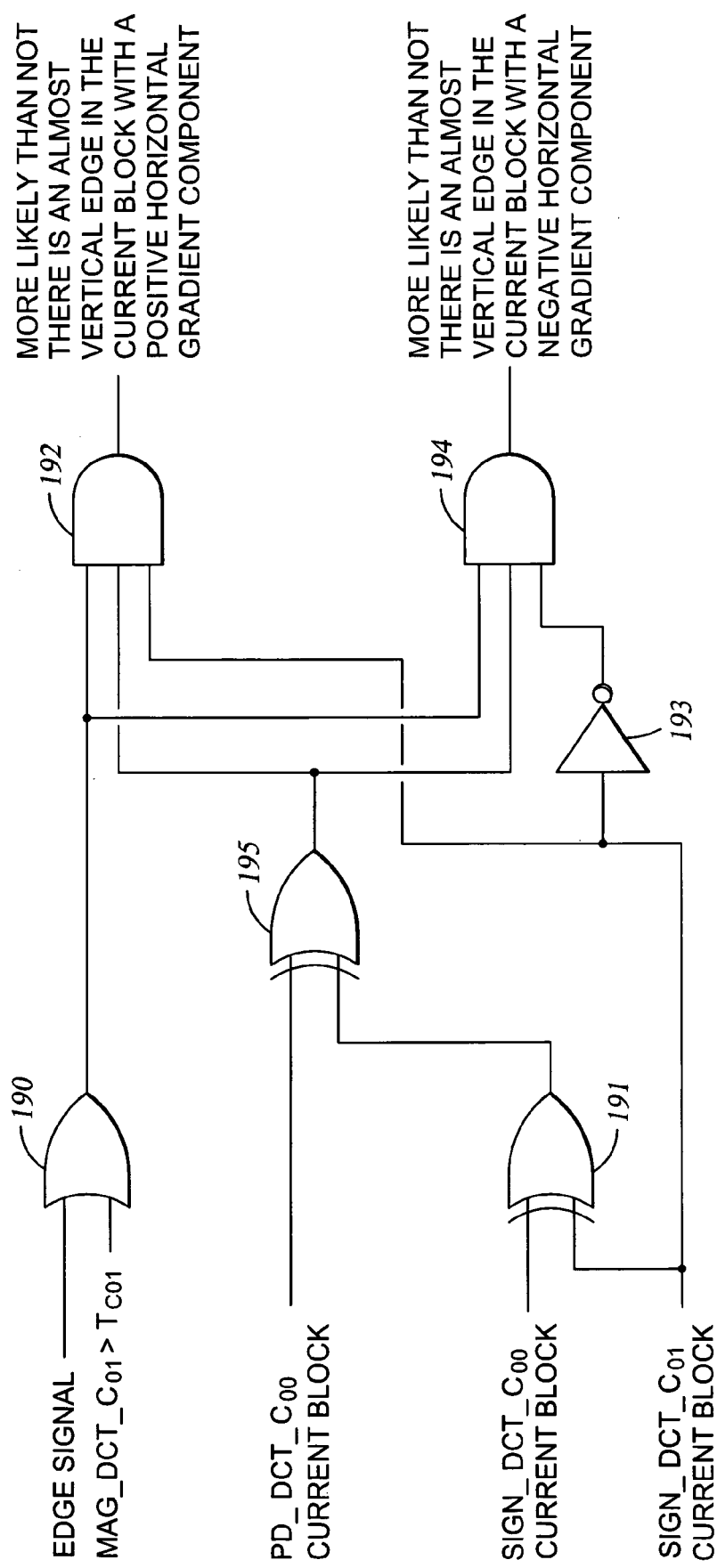
FIG. 24 shows logic responsive to attributes of only a current block for detecting when it is more likely than not that there is an almost vertical edge in the current block with a positive horizontal gradient component, and for detecting when it is more likely than not that there is an almost vertical edge in the current block with a negative horizontal gradient component.

FIG. 24 shows logic responsive to attributes of only a current block for detecting when within the current block there is (more likely than not) an almost vertical edge with a negative horizontal gradient component and when within the current block there is (more likely than not) an almost vertical edge with a positive horizontal gradient component. In this case, the MPEG encoded bit-stream segment for the current block is parsed to determine whether there is a variable-length code for the lowest order AC horizontal frequency coefficient $C_{01}$ and if so, a signal (MAG_DCT_$C_{01}$.GT.$T_{C01}$) is provided indicating whether or not the magnitude of the coefficient $C_{01}$ is greater than a threshold $T_{C01}$, and a signal (SIGN_DCT_$C_{01}$) is provided indicating the sign of the coefficient $C_{01}$. The threshold $T_{C01}$ can be calculated by taking the inner product of the DCT basis image associated with the coefficient $C_{01}$, with an ideal vertical step edge of the minimal contrast level desired to be detected. Furthermore, this threshold value can be replaced by a fraction of it to account for the influences of non-ideal (finite gradient) edges which are neither exactly vertical nor centered within the current block. An OR gate 190 combines the value of the EDGE_SIGNAL for the current block with the value of MAG_DCT_$C_{01}$>$T_{C01}$ for the current block, to enable edge detection even when edge detection based on dct_dc_size_luminance or dct_dc_size_chrominance thresholding fails (EDGE_SIGNAL equals logic 0) due to an almost vertical edge in the current block translated significantly away from the prior block. An exclusive-OR gate 191 compares the sign of the DCT DC coefficient $C_{00}$ of the current block with the sign of the DCT AC coefficient $C_{01}$ of the current block to produce a logic 1 if the signs are different and a logic 0 if the signs are the same. Having opposite signs for the coefficients $C_{00}$ and $C_{01}$ is consistent with having a simple almost vertical step edge within the current block when for the current block PD_DCT_$C_{00}$ equals 0 and having the same sign for the coefficients $C_{00}$ and $C_{01}$ is consistent with having a simple almost vertical step edge within the current block when for the current block PD_DCT_$C_{00}$ equals 1 and all other cases in general imply the existence of a more complex pattern in that image region possibly with multiple edges. An exclusive-OR gate 195 combines the output of the exclusive-OR gate 191 with the logical signal PD_DCT_$C_{00}$ for the current block to signal the potential presence of a simple almost vertical step edge within the current block. An AND gate 192 produces a signal that is a logic 1 indicating that more likely than not there is an almost vertical edge in the current block with a positive horizontal gradient component if the edge signal or MAG_DCT_$C_{01}$.GT.$T_{C01}$ is a logic 1, the sign of the lowest order DCT AC horizontal frequency coefficient $C_{01}$ is negative (SIGN_DCT_$C_{01}$ is a logic 1) for the current block, and the exclusive-OR gate 195 produces a logic 1 indicating that either the sign of the coefficient $C_{00}$ for the current block is different from the sign of the coefficient $C_{01}$ for the current block and PD_DCT_$C_{00}$=0 or the sign of the coefficient $C_{00}$ for the current block is the same as the sign of the coefficient $C_{01}$ for the current block and PD_DCT_$C_{00}$=1. An inverter 193 inverts the value of SIGN_DCT_$C_{01}$ for the current block to produce a logic 1 when the sign of the coefficient $C_{01}$ is positive for the current block. An AND gate 194 produces a signal that is a logic 1 indicating that more likely than not there is an almost vertical edge in the current block with a negative horizontal gradient component if the edge signal or MAG_DCT_$C_{01}$.GT.$T_{C01}$ is a logic 1, the sign of the lowest order DCT AC horizontal frequency coefficient $C_{01}$ is positive (SIGN_DCT_$C_{01}$ is a logic 0) for the current block, and the exclusive-OR gate 195 produces a logic 1 indicating that either the sign of the coefficient $C_{00}$ for the current block is different from the sign of the coefficient $C_{01}$ for the current block and PD_DCT_$C_{00}$=0 or the sign of the coefficient $C_{00}$ for the current block is the same as the sign of the coefficient $C_{01}$ for the current block and PD_DCT_$C_{00}$=1.

Figure 25:
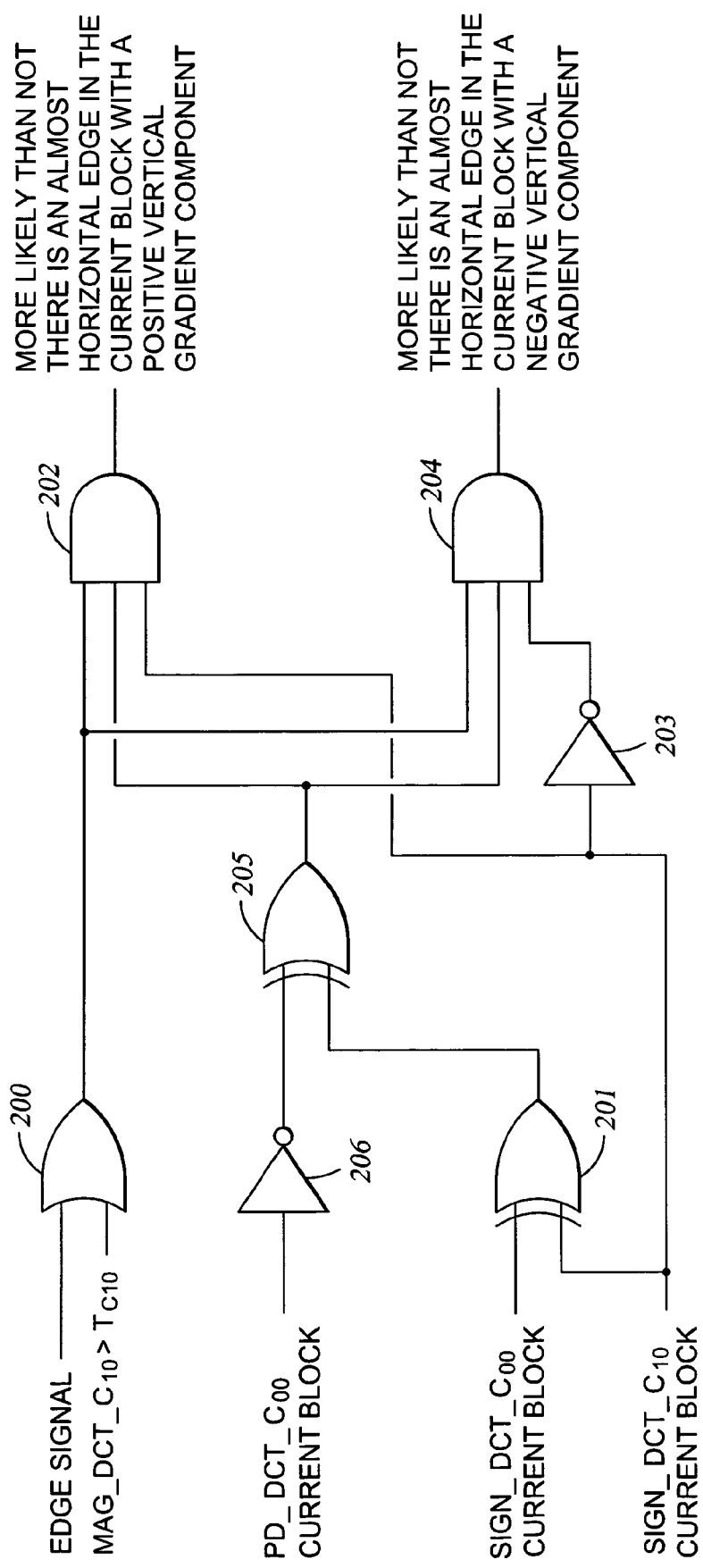
FIG. 25 shows logic responsive to attributes of only a current block for detecting when it is more likely than not that there is an almost horizontal edge in the current block with a positive vertical gradient component; and for detecting when it is more likely than not that there is an almost horizontal edge in the current block with a negative vertical gradient component.

FIG. 25 shows logic responsive to attributes of only a current block for detecting when within the current block there is (more likely than not) an almost horizontal edge with a negative vertical gradient component and when within the current block there is (more likely than not) an almost horizontal edge with a positive vertical gradient component. For this logic to be applicable, in the adopted block scan order, either the current block should be located in the block row above the previous block or the current block should be located in the block row below the previous block. The MPEG encoded bit-stream segment for the current block is parsed to determine whether there is a variable-length code for the lowest order AC vertical frequency coefficient $C_{10}$ and if so, a signal (MAG_DCT_$C_{10}$.GT.$T_{C10}$) is provided indicating if or not the magnitude of the coefficient $C_{10}$ is greater than a threshold $T_{C10}$, and a signal (SIGN_DCT_$C_{10}$) is provided indicating the sign of the coefficient $C_{10}$. The threshold $T_{C10}$ can be calculated by taking the inner product of the DCT basis image associated with the coefficient $C_{10}$, with an ideal horizontal step edge of the minimal contrast level desired to be detected. Furthermore, this threshold value can be replaced by a fraction of it to account for the influences of non-ideal (finite gradient) edges which are neither exactly horizontal nor centered within the current block. An OR gate 200 combines the value of the EDGE_SIGNAL for the current block with the value of MAG_DCT_$C_{10}$>$T_{C10}$ for the current block, to enable edge detection even when edge detection based on dct_dc_size_luminance or dct_dc_size_chrominance thresholding fails (EDGE_SIGNAL equals logic 0) due to an almost horizontal edge in the current block translated significantly away from the prior block. An exclusive-OR gate 201 compares the sign of the DCT DC coefficient $C_{00}$ of the current block with the sign of the DCT AC coefficient $C_{10}$ of the current block to produce a logic 1 if the signs are different and a logic 0 if the signs are the same. Having opposite signs for the coefficients $C_{00}$ and $C_{10}$ is consistent with having a simple almost horizontal step edge within the current block when for the current block PD_DCT_$C_{00}$ equals 1 and having the same sign for the coefficients $C_{00}$ and $C_{10}$ is consistent with having a simple almost horizontal step edge within the current block when for the current block PD_DCT_$C_{00}$ equals 0 and all other cases in general imply the existence of a more complex pattern in that image region possibly involving multiple edges. An exclusive-OR gate 205 combines the output of the exclusive-OR gate 201 with the negation of the logical signal PD_DCT_$C_{00}$ for the current block provided by the inverter 206 to signal the potential presence of a simple almost horizontal step edge within the current block. An AND gate 202 produces a signal that is a logic 1 indicating that more likely than not there is an almost horizontal edge in the current block with a positive vertical gradient component if the edge signal or MAG_DCT_$C_{10}$.GT.$T_{C10}$ is a logic 1, the sign of the lowest order DCT AC vertical frequency coefficient $C_{10}$ is negative (SIGN_DCT_$C_{10}$ is a logic 1) for the current block, and the exclusive-OR gate 205 produces a logic 1 indicating that either the sign of the coefficient $C_{00}$ for the current block is different from the sign of the coefficient $C_{10}$ for the current block and PD_DCT_$C_{00}$=1 or the sign of the coefficient $C_{00}$ for the current block is the same as the sign of the coefficient $C_{10}$ for the current block and PD_DCT_$C_{00}$=0. An inverter 203 inverts the value of SIGN_DCT_$C_{10}$ for the current block to produce a logic 1 when the sign of the coefficient $C_{10}$ is positive for the current block. An AND gate 204 produces a signal that is a logic 1 indicating that more likely than not there is an almost horizontal edge in the current block with a negative vertical gradient component if the edge signal or MAG_DCT_$C_{10}$.GT.$T_{C10}$ is a logic 1, the sign of the lowest order DCT AC vertical frequency coefficient $C_{10}$ is positive (SIGN_DCT_$C_{10}$ is a logic 0) for the current block, and the exclusive-OR gate 205 produces a logic 1 indicating that either the sign of the coefficient $C_{00}$ for the current block is different from the sign of the coefficient $C_{10}$ for the current block and PD_DCT_$C_{00}$=1 or the sign of the coefficient $C_{00}$ for the current block is the same as the sign of the coefficient $C_{10}$ for the current block and PD_DCT_$C_{00}$=0.

As described above, there are various ways of producing edge indicating bits from which can be calculated auto-coincidence counts and cross-coincidence counts for detecting scene changes. Another way of extracting features from the edge indicating data is to trace the edges to detect joints where the edges intersect in order to construct graphs representing the morphology of objects in a scene. The graph of a current frame can be compared to a graph of a prior frame to detect significant differences in the location and number of the joints and in the number of edges that intersect at the joints. The information about the edge graphs for the I-frames could be stored as I-frame metadata for use by a media database search engine to find the I-frames that match a given frame or a search specification in terms of graph characteristics. As such, the edge graph information can be used for object identification in the compressed data domain.

When tracing edges to find joints, the thinning filter of FIG. 9 could be used to retain less significant edge segments that would provide connections between the joints. The code length and sign of the DCT DC coefficients could be saved in a frame buffer for ease of access and comparison when tracing the edges in a vertical, horizontal or diagonal direction when searching for the joints. It may also be desirable to have more information about the direction of the edges. One way of extracting more information about the direction of the edges is to compute an estimate of the gradient vector of an edge from the lowest AC horizontal frequency DCT coefficient $C_{01}$ and the lowest AC vertical frequency DCT coefficient $C_{10}$ for the current block.

Figure 26:
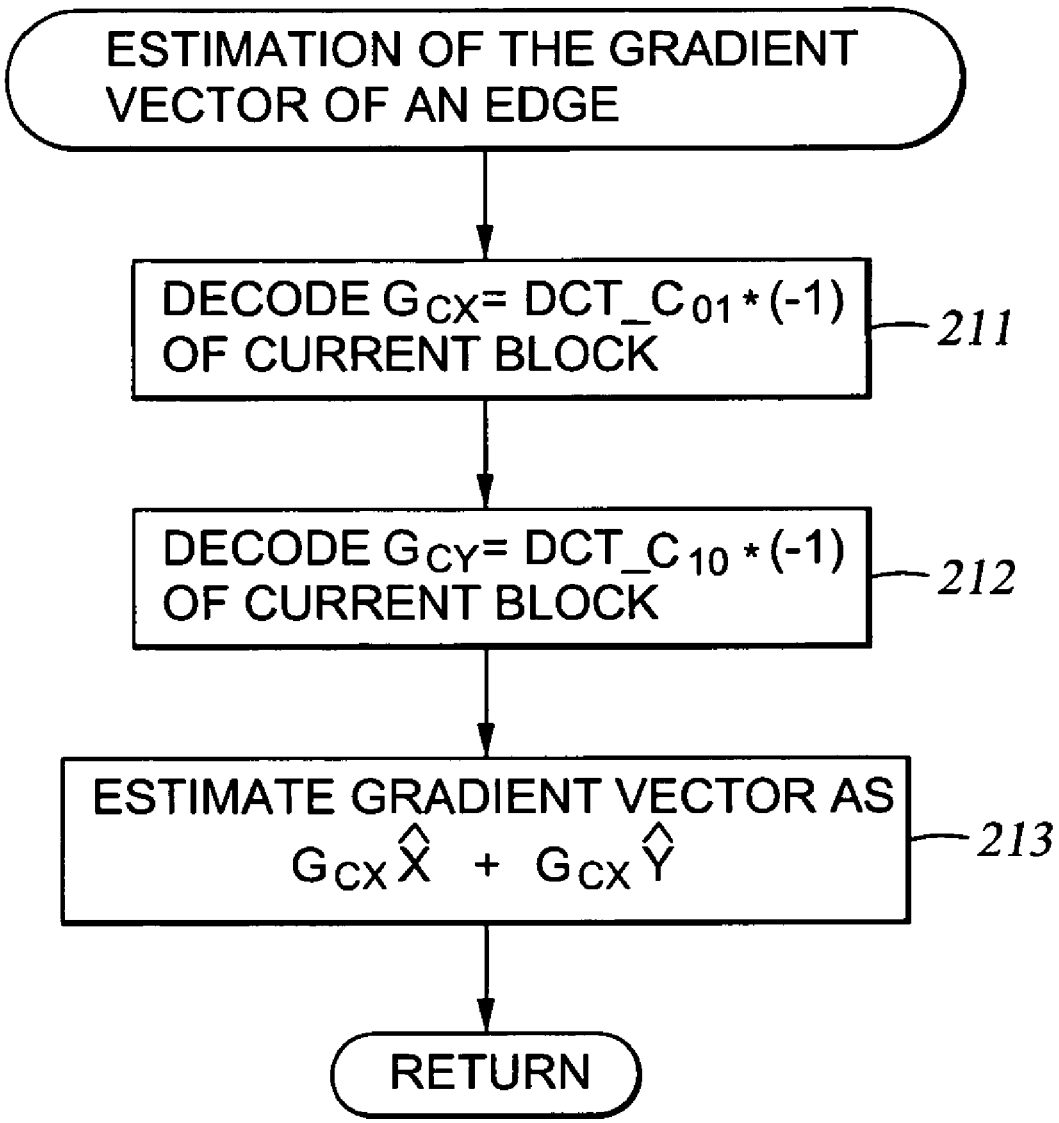
FIG. 26 is a flow chart of a procedure for estimating the gradient vector of an edge.

FIG. 26 is a flow chart of a procedure for estimating the gradient vector of an edge. In a first step 211, the processor decodes an "x" component $G_{cx}$ of the gradient vector for the current block as the value of the lowest AC horizontal frequency DCT coefficient $C_{01}$ for the current block with a sign inversion. In step 212, the processor decodes a "y" component $G_{cy}$ of the gradient vector for the current block as the value of the lowest AC vertical frequency DCT coefficient $C_{10}$ for the current block with a sign inversion. Both sign inversions are necessary owing to the reference polarities of the basis images associated with the DCT coefficients $C_{01}$ and $C_{10}$ as well as the standard positive senses' being fixed as towards right and towards down respectively along the horizontal and vertical directions of an image. In step 213, the gradient vector of the edge is estimated as $G_{cx}x+G_{cy}y$.

In view of the above, there have been described very fast and computationally efficient methods of edge detection for block coded video and scene change detection for MPEG video. Edges are detected in block coded video by a threshold comparison upon the lengths of variable-length codes used for encoding the differential DC coefficients of the pixel blocks. A thinning filter compares the code lengths of the differential DC coefficients of adjacent blocks in order to retain the edge indications of more significant edges and to exclude the edge indications of less significant edges. The edge indications can be split into substantially independent channels for luminance or chrominance, for edges having positive or negative horizontal gradient components as indicated by the sign of the differential DC coefficient, the prediction direction of the differential DC coefficient, and the sign of the lowest horizontal frequency DCT coefficient for the pixel block containing the edge or for edges having positive or negative vertical gradient components as indicated by the sign of the differential DC coefficient, the prediction direction of the differential DC coefficient, and the sign of the lowest vertical frequency DCT coefficient for the pixel block containing the edge. An approximate gradient vector of an edge can be computed from the lowest horizontal frequency DCT coefficient and the lowest vertical frequency DCT coefficient. The edge indications for successive frames in an MPEG sequence can be compared to each other in various ways in order to detect scene changes.

What is claimed is:

1. A method of detecting edges in a compressed video sequence, the compressed video sequence including at least one frame of block encoded video data, the frame of block encoded video data including variable-length codes for transform coefficients of blocks of pixels in the compressed video sequence, the transform coefficients including a respective DC coefficient for each of the blocks of pixels, each respective DC coefficient for at least some of the blocks of pixels being encoded as a respective variable-length code having a length indicating a certain range of differences in DC coefficient values between adjacent ones of the blocks of pixels, wherein the method comprises:

decoding only the length of the respective variable-length code for the respective DC coefficient for each of said at least some of the blocks of pixels in order to produce an indication of whether or not the compressed video sequence includes an edge associated with said each of said at least some of the blocks of pixels; and performing a code length threshold comparison upon the length of the respective variable-length code for the respective DC coefficient for said each of said at least some of the blocks of pixels for producing at least one respective bit indicating whether or not the compressed video sequence includes an edge associated with said each of said at least some of the blocks of pixels.

2. The method as claimed in claim 1, wherein the compressed video sequence is a color video sequence and there is a respective DC luminance coefficient or a respective DC $C_b$ chrominance coefficient or a respective DC $C_r$ chrominance coefficient for each of the blocks of pixels depending on a color channel of each of the blocks of pixels, and the method includes:

decoding the length of the respective variable-length code for the respective DC luminance coefficient or DC $C_b$ chrominance coefficient or DC $C_r$ chrominance coefficient of said each of said at least some of the blocks of pixels; and comparing the decoded length of the respective variable-length code for the respective DC luminance coefficient or DC $C_b$ chrominance coefficient or DC $C_r$ chrominance coefficient of said each of said at least some of the blocks of pixels to at least one length threshold to produce at least one respective bit indicating whether or not the compressed video sequence includes a luminance edge or a $C_b$ chrominance edge or a $C_r$ chrominance edge associated with said each of said at least some of the blocks of pixels.

3. The method as claimed in claim 1, wherein the compressed video sequence is a color video sequence and there is a respective DC luminance coefficient or a respective DC $C_b$ chrominance coefficient or a respective DC $C_r$ chrominance coefficient for each of the blocks of pixels depending on a color channel of each of the blocks of pixels, and the method includes:

decoding the length of the respective variable-length code for the respective DC luminance coefficient of said each of said at least some of the blocks of pixels;

decoding the length of the respective variable-length code for the respective DC $C_b$ chrominance coefficient of said each of said at least some of the blocks of pixels;

decoding the length of the respective variable-length code for the respective DC $C_r$ chrominance coefficient of said each of said at least some of the blocks of pixels;

combining the length of the respective variable-length code for the respective DC luminance coefficient of said each of said at least some of the blocks of pixels with the lengths of the respective variable-length codes for the respective DC $C_b$ and $C_r$ chrominance coefficients of said each of said at least some of the blocks of pixels to produce a combined code length; and wherein at least one code length threshold is compared to the combined code length for producing at least one respective bit indicating whether or not the compressed video sequence includes an edge associated with said each of said at least some of the blocks of pixels.

4. The method as claimed in claim 3, wherein the combined code length is produced by adding the length of the respective variable-length code for the respective DC luminance coefficient of said each of said at least some of the blocks of pixels to the sum of the lengths of the respective variable-length codes for the respective DC $C_b$ and $C_r$ chrominance coefficients of said each of said at least some of the blocks of pixels.

5. The method as claimed in claim 1, which includes using a thinning filter for filtering the respective bits indicating whether or not the compressed video sequence includes an edge associated with each of said at least some of the blocks of pixels.

6. The method as claimed in claim 5, wherein the filtering of the respective bits indicating whether or not the compressed video sequence includes an edge associated with said each of said at least some of the blocks of pixels includes comparing the lengths of the respective variable-length codes of the DC coefficients for adjacent blocks of pixels in order to retain indications of edges associated with blocks of pixels having longer variable-length codes for their respective DC coefficients and to exclude indications of edges associated with blocks of pixels having shorter variable-length codes for their respective DC coefficients.

7. The method as claimed in claim 6, wherein an indication of an edge associated with a block of pixels having a shorter variable-length code of the respective DC coefficients for a pair of adjacent blocks of pixels is not excluded upon comparing signs of the respective DC coefficients for the pair of adjacent blocks of pixels and finding that the signs are different.

8. The method as claimed in claim 1, which includes inspecting signs of the respective DC coefficients for said at least some of the blocks of pixels, and based on the signs of the respective DC coefficients for said at least some of the blocks of pixels and based on prediction directions of the respective DC coefficients for said at least some of the blocks of pixels and based on the respective bits indicating whether or not the compressed video sequence includes an edge associated with said at least some of the blocks of pixels, producing a first series of bits indicating whether or not the compressed video sequence includes positive horizontal gradient component edges associated with said at least some of the blocks of pixels, and producing a second series of bits indicating whether or not the compressed video sequence includes negative horizontal gradient component edges associated with said at least some of the blocks of pixels.

9. The method as claimed in claim 1, which includes inspecting signs of the respective DC coefficients for said at least some of the blocks of pixels, and based on the signs of the respective DC coefficients for said at least some of the blocks of pixels and based on prediction directions of the respective DC coefficients for said at least some of the blocks of pixels and based on the respective bits indicating whether or not the compressed video sequence includes an edge associated with said at least some of the blocks of pixels, producing a first series of bits indicating whether or not the compressed video sequence includes positive vertical gradient component edges associated with said at least some of the blocks of pixels, and producing a second series of bits indicating whether or not the compressed video sequence includes negative vertical gradient component edges associated with said at least some of the blocks of pixels.

10. The method as claimed in claim 1, wherein the transform coefficients include respective horizontal frequency transform coefficients and respective vertical frequency transform coefficients for each block of pixels, and the method includes inspecting a lowest nonzero horizontal frequency transform coefficient and a lowest nonzero vertical frequency transform coefficient for at least one of the blocks of pixels to determine orientation of an edge associated with said at least one of the blocks of pixels.

11. The method as claimed in claim 1, wherein the transform coefficients include respective horizontal frequency transform coefficients and respective vertical frequency transform coefficients for each block of pixels, and the method includes using a lowest nonzero horizontal frequency transform coefficient and a lowest nonzero vertical frequency transform coefficient for at least one of the blocks of pixels for computing an approximate gradient vector of an edge associated with said at least one of the blocks of pixels.

12. A method of detecting edges in a compressed video sequence, the compressed video sequence including at least one I-frame of MPEG video data, the I-frame of MPEG video data including variable-length codes for DCT coefficients of 8×8 pixel blocks in the compressed video sequence, the DCT coefficients including a respective DC coefficient for each of the 8×8 pixel blocks, each respective DC coefficient for at least some of the 8×8 pixel blocks being encoded as a respective variable-length code having a length indicating a certain range of differences in DC coefficient values between adjacent ones of the 8×8 pixel blocks, wherein the method comprises:
 decoding only the length of the respective variable-length code for the respective DC coefficient for each of said at least some of the 8×8 pixel blocks in order to produce an indication of whether or not the compressed video sequence includes an edge associated with said each of said at least some of the 8×8 pixel blocks; and
 performing a code length threshold comparison upon the length of the respective variable-length code for the respective DC coefficient for said each of said at least some of the 8×8 pixel blocks for producing at least one respective bit indicating whether or not the compressed video sequence includes an edge associated with said each of said at least some of the 8×8 pixel blocks.

13. The method as claimed in claim 12, wherein the compressed video sequence is a color video sequence and there is a respective DC luminance coefficient or a respective DC $C_b$ chrominance coefficient or a respective DC $C_r$ chrominance coefficient for each of the 8×8 pixel blocks depending on a color channel of each of the 8×8 pixel blocks, and the method includes:
 decoding the length of the respective variable-length code for the respective DC luminance coefficient or DC $C_b$ chrominance coefficient or DC $C_r$ chrominance coefficient of said each of said at least some of the 8×8 pixel blocks; and
 comparing the decoded length of the respective variable-length code for the respective DC luminance coefficient or DC $C_b$ chrominance coefficient or DC $C_r$ chrominance coefficient of said each of said at least some 8×8 pixel blocks to at least one length threshold to produce at least one respective bit indicating whether or not the compressed video sequence includes a luminance edge or a $C_b$ chrominance edge or a $C_r$ chrominance edge associated with said each of said at least some of the 8×8 pixel blocks.

14. The method as claimed in claim 12, wherein the compressed video sequence is a color video sequence and there is a respective DC luminance coefficient or a respective DC $C_b$ chrominance coefficient or a respective DC $C_r$ chrominance coefficient for each of the 8×8 pixel blocks depending on a color channel of each of the 8×8 pixel blocks, and the method includes:
 decoding the length of the respective variable-length code for the respective DC luminance coefficient of said each of said at least some of the 8×8 pixel blocks;
 decoding the length of the respective variable-length code for the respective DC $C_b$ chrominance coefficient of said each of said at least some of the 8×8 pixel blocks;
 decoding the length of the respective variable-length code for the respective DC $C_r$ chrominance coefficient of said each of said at least some of the 8×8 pixel blocks;
 combining the length of the respective variable-length code for the respective DC luminance coefficient of said each of said at least some of the 8×8 pixel blocks with the lengths of the respective variable-length codes for the respective DC $C_b$ and $C_r$ chrominance coefficients of said each of said at least some of the 8×8 pixel blocks to produce a combined code length; and
 wherein at least one code length threshold is compared to the combined code length for producing at least one respective bit indicating whether or not the compressed video sequence includes an edge associated with said each of said at least some of the 8×8 pixel blocks.

15. The method as claimed in claim 14, wherein the combined code length is produced by adding the length of the respective variable-length code for the respective DC luminance coefficient of said each of said at least some of the 8×8 pixel blocks to the sum of the lengths of the respective variable-length codes for the respective DC $C_b$ and $C_r$ chrominance coefficients of said each of said at least some of the 8×8 pixel blocks.

16. The method as claimed in claim 12, which includes using a thinning filter for filtering the respective bits indicating whether or not the compressed video sequence includes an edge associated with each of said at least some of the 8×8 pixel blocks.

17. The method as claimed in claim 16, wherein the filtering of the respective bits indicating whether or not the compressed video sequence includes an edge associated with said each of said at least some of the 8×8 pixel blocks includes comparing the lengths of the respective variable-length codes of the DC coefficients for adjacent 8×8 pixel blocks in order to retain indications of edges associated with 8×8 pixel blocks having longer variable-length codes for their respective DC coefficients and to exclude indications of edges associated with 8×8 pixel blocks having shorter variable-length codes for their respective DC coefficients.

18. The method as claimed in claim 17, wherein an indication of an edge associated with a block of pixels having a shorter variable-length code of the respective DC coefficients for a pair of adjacent 8×8 pixel blocks is not excluded upon comparing signs of the respective DC coefficients for the pair of adjacent 8×8 pixel blocks and finding that the signs are different.

19. The method as claimed in claim 12, which includes inspecting signs of the respective DC coefficients for said at least some of the 8×8 pixel blocks, and based on the signs of the respective DC coefficients for said at least some of the 8×8 pixel blocks and based on prediction directions of the respective DC coefficients for said at least some of the 8×8 pixel blocks and based on the respective bits indicating whether or not the compressed video sequence includes an edge associated with said at least some of the 8×8 pixel blocks, producing a first series of bits indicating whether or not the compressed video sequence includes positive horizontal gradient component edges associated with said at least some of the 8×8 pixel blocks, and producing a second series of bits indicating whether or not the compressed video sequence includes negative horizontal gradient component edges associated with said at least some of the 8×8 pixel blocks.

20. The method as claimed in claim 12, wherein the DCT coefficients include respective horizontal frequency DCT coefficients and respective vertical frequency DCT coefficients for each of the 8×8 pixel blocks, and the method includes inspecting a lowest nonzero horizontal frequency DCT coefficient and a lowest nonzero vertical frequency DCT coefficient for at least one of the 8×8 pixel blocks to determine orientation of an edge associated with said at least one of the 8×8 pixel blocks.

21. The method as claimed in claim 12, wherein the DCT coefficients include respective horizontal frequency DCT coefficients and respective vertical frequency DCT coefficients for each of the 8×8 pixel blocks, and the method includes using a lowest nonzero horizontal frequency DCT coefficient and a lowest nonzero vertical frequency DCT coefficient for at least one of the 8×8 pixel blocks for computing an approximate gradient vector of an edge associated with said at least one of the 8×8 pixel blocks.

22. The method as claimed in claim 11, which includes inspecting signs of the respective DC coefficients for said at least some of the 8×8 pixel blocks, and based on the signs of the respective DC coefficients for said at least some of the 8×8 pixel blocks and based on prediction directions of the respective DC coefficients for said at least some of the 8×8 pixel blocks and based on the respective bits indicating whether or not the compressed video sequence includes an edge associated with said at least some of the 8×8 pixel blocks, producing a first series of bits indicating whether or not the compressed video sequence includes positive vertical gradient component edges associated with said at least some of the 8×8 pixel blocks, and producing a second series of bits indicating whether or not the compressed video sequence includes negative vertical gradient component edges associated with said at least some of the 8×8 pixel blocks.

* * * * *

UNITED STATES PATENT AND TRADEMARK OFFICE
CERTIFICATE OF CORRECTION

PATENT NO. : 7,054,367 B2  Page 1 of 1
APPLICATION NO. : 10/038949
DATED : May 30, 2006
INVENTOR(S) : Seyfullah H. Oguz and Ugur Sezer It is certified that error appears in the above-identified patent and that said Letters Patent is hereby corrected as shown below:

In claim 2, col. 19, line 63, --coefficient-- is inserted before "for".

Signed and Sealed this

Eighth Day of August, 2006

JON W. DUDAS
*Director of the United States Patent and Trademark Office*